United States Patent
Gorman et al.

[11] Patent Number: 5,268,631
[45] Date of Patent: Dec. 7, 1993

[54] POWER CONTROL SYSTEM WITH IMPROVED PHASE CONTROL

[75] Inventors: John E. Gorman, Cicero; Rufus W. Warren, Oak Lawn, both of Ill.

[73] Assignee: Chicago Stage Equipment Co., Oak Lawn, Ill.

[21] Appl. No.: 788,437

[22] Filed: Nov. 6, 1991

[51] Int. Cl.⁵ .............................. G05F 1/455
[52] U.S. Cl. ....................... 323/246; 323/237; 323/243; 323/320; 323/326; 323/905
[58] Field of Search ............ 323/235, 237, 242, 243, 323/246, 319, 320, 326, 905

[56] References Cited

U.S. PATENT DOCUMENTS

| | | | |
|---|---|---|---|
| 3,859,591 | 1/1975 | Saunders | 323/319 |
| 3,990,000 | 11/1976 | Digneffe | 323/322 |
| 4,039,928 | 8/1977 | Noftsker et al. | 323/243 |
| 4,047,235 | 4/1977 | Davis | 323/243 |
| 4,267,502 | 5/1981 | Reese et al. | 323/237 |
| 4,356,433 | 10/1982 | Linden | 323/246 |
| 4,528,494 | 7/1985 | Bloomer | 323/237 |
| 4,580,080 | 4/1986 | Smith | 323/243 |
| 4,633,161 | 12/1986 | Callahan et al. | 323/242 |
| 4,649,302 | 3/1987 | Damiano et al. | 307/584 |
| 4,680,490 | 7/1987 | Baker et al. | 307/575 |
| 4,688,161 | 8/1987 | Covington | 323/235 |
| 4,810,952 | 3/1989 | Cohen | 323/326 |
| 4,949,020 | 8/1990 | Warren et al. | 315/297 |
| 4,975,629 | 12/1990 | Callahan et al. | 323/235 |
| 5,004,969 | 4/1991 | Schanin | 323/235 |
| 5,045,774 | 9/1991 | Bromberg | 323/246 |

Primary Examiner—J. L. Sterrett
Attorney, Agent, or Firm—Trexler, Bushnell, Giangiorgi & Blackstone, Ltd.

[57] ABSTRACT

An improved phase-controlled power control apparatus includes a semiconductor switching element for varying the effective power delivered to a load from the power lines. The conduction angle of the semiconductor power switch element is varied from a nominal angle to compensate for changes in power line voltage and for changes in load current. The amount of load current flow is continuously compared to the power line voltage to detect any overcurrent condition, even very close to the zero-crossing of the power line voltage. The shape of the transition from load current on to load current off (or vice versa) in controlled to minimize audible noise from the load. The load current can be shared between a plurality of compatible power control sections.

15 Claims, 21 Drawing Sheets

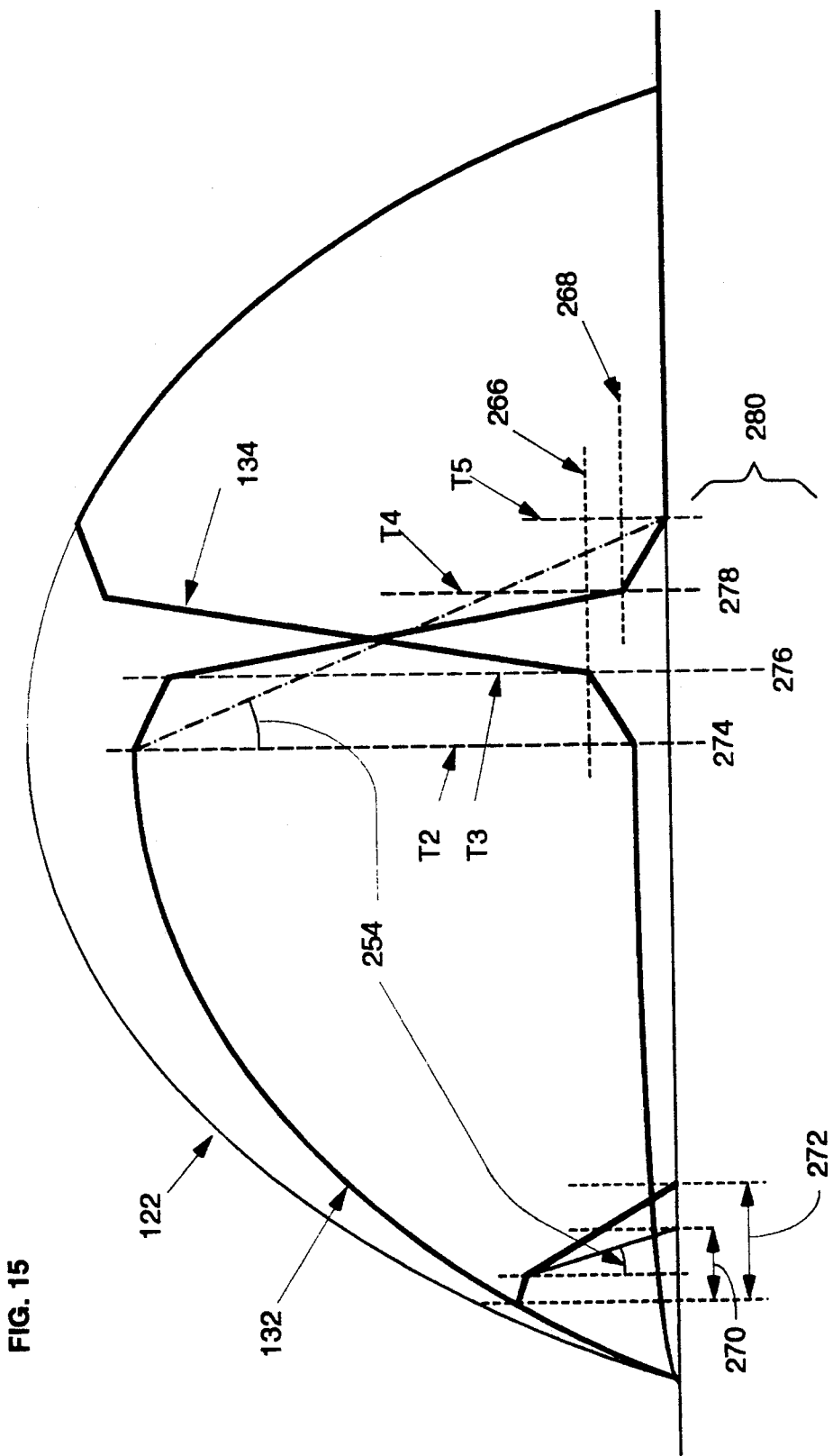

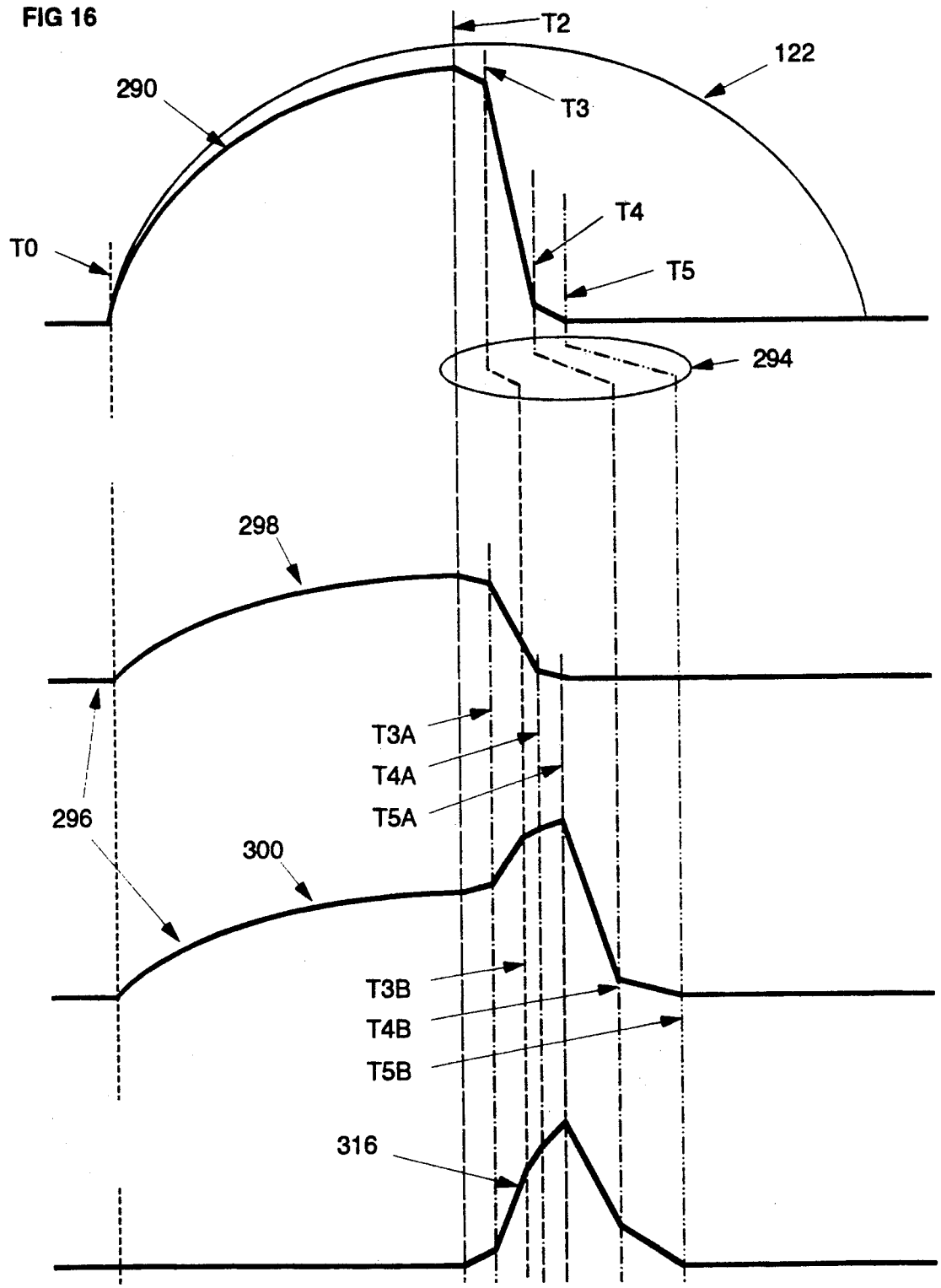

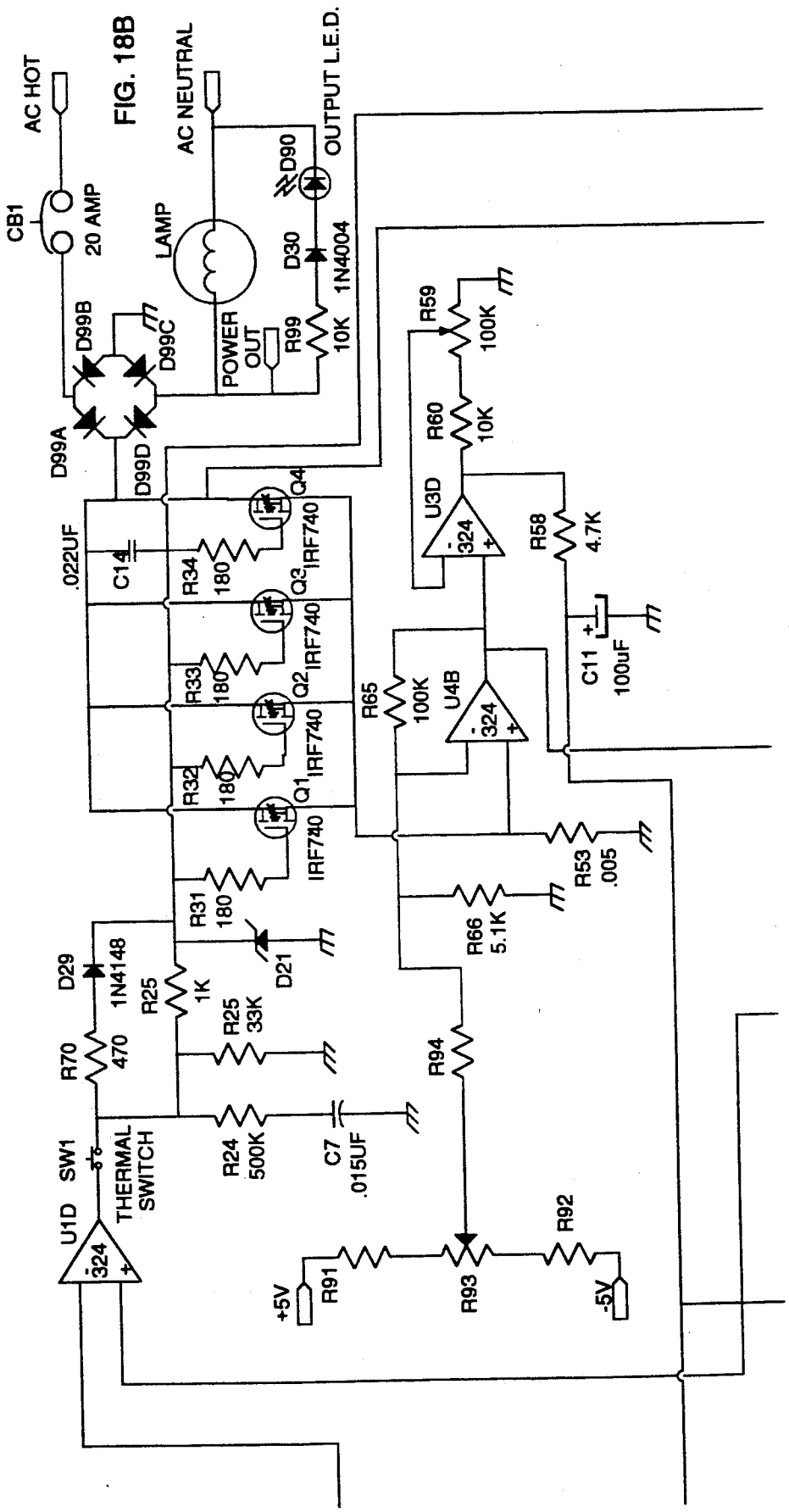

POWER CONTROL SYSTEM WITH IMPROVED PHASE CONTROL

BACKGROUND OF THE INVENTION

While the invention may find application in many electrical power control situations (e.g., lamps, heaters, motors, etc.), the following discussion refers particularly to the control of the dimming of lamps such as in a theatrical lighting system. Phase controlled dimming systems using semiconductors to switch the load current on and off are well known. This type of circuit is known for its efficiency and effectiveness for the purpose. Also known are several disadvantages.

Electromagnetic interference (EMI) from the dimmer circuitry and power lines, and audible noise from lamp filaments are associated with the rapid changes in load voltage and current. Dimmers which employ rapidly switched power control elements require inductance and/or capacitance to slow down the rate of current change in the load to minimize this interference and noise. The longer the transition time between no current flow and full current flow, the less objectionable these effects are. Increasing this switching time with chokes require larger and lossier inductors to decrease these effects. Previous chokeless dimmers which increase the switching time by turning the power switch element itself on or off at a relatively slow rate require rise times similar to those obtained by use of chokes. These long rise times lead to higher switching component temperatures and less efficiency in the dimmer. We propose improvements which allow control of the shape of the rise time waveform to provide excellent noise reduction while reducing the risetime for increased efficiency and less heat generation.

A semiconductor power switch is susceptible to damage or destruction from excessive current flow, especially when a transistor is used instead of a thyristor. Previous dimmers have used various methods to monitor current flow, but have required that the current exceed the maximum allowable for the dimmer before triggering an overload condition. This does protect the power switch adequately, but compromises must be made. If the shutdown circuit must be reset manually after tripping, the overload current threshold must be set very high compared to the long-term current in order to avoid nuisance tripping due to cold lamp filaments. If the shutdown circuit resets automatically (perhaps every half-cycle), then large repetitive currents will flow each time power is applied, until the current trip point is reached after each power application. By using the signals from the load current sensing in new ways, improvement are possible to provide features beyond protection.

Unwanted variations in load voltages are very undesirable in many situations. Lighting designers in theaters take great pains to set light levels exactly for various effects, and even relatively small brightness changes with incandescent lamps cause variations in color temperature which are extremely troublesome for television, movie and photography studios.

These variations have several sources. Changes in AC power line voltage cause the power delivered to the load to change, leading to noticeable brightness variations in lamp loads. In addition, the long wire runs used in many lighting applications between the dimmer and the load are responsible for voltage drops which cause a high-wattage lamp to receive less voltage than a low-wattage lamp at a given dimmer output. Previous dimmers which allow individual adjustment for each output connection have required calibration for each different load at each outlet, and re-adjustment of the dimmer is required whenever the load is to be changed.

Acoustic noise from lamp filaments is undesirable in many dimming applications, especially television and movie studios. The changes in current which are typical of phase-control dimmers cause lamp filaments to vibrate. The more rapidly the current changes, the more noise is produced. Phase-control dimmers, both choke-type and previous chokeless designs, slow down the transition time between full current flow and no current flow to minimize this filament noise.

The inductance of choke-type dimmers slows down the current change, and thereby reduces the filament noise. However, this method of noise reduction has several drawbacks. First, the shape of the current waveform depends on the amount of current flowing through the load, so the amount of quieting varies with changes in the load. Second, the shape of the current waveform is dependent on the load and the choke, and is not adjustable. Third, the chokes required for this purpose are large, heavy and expensive.

Chokeless phase-control dimmers using transistor control the switching of the power semiconductors so they are, for a time, operating in their linear mode rather than full-on or full-off. However, the greatest amount of heat is dissipated during this "linear mode" switching time. For the multi-kilowatt level, the power switching devices increase greatly in size and cost. In addition, the heat dissipation required of the power switch increases much faster than the current it controls because the voltage drop across the switch tends to increase with increased current flow. Also, the heat dissipation is concentrated, requiring the use of expensive custom heat sinks and hardware, and limiting opportunities for using the dimmer in a variety of configurations.

Because transistors only control current in one direction, a full-wave dimmer must make provisions for current routing in the proper direction for each switch. This can be done by connecting certain semiconductors (such as FETs) in inverse series, so the internal diode formed by the transistor construction passes current in the reverse direction to the transistor's control direction. Transistors can also be connected in inverse parallel (with blocking diodes, if necessary). However, either of these approaches require the use of twice as many expensive transistors as would be indicated by the amount of current flow.

Another approach, as shown in our prior U.S. Pat. No. 4,949,020, is to use a diode bridge to present only rectified AC to the semiconductor switch, and to parallel switch transistors as needed for the current required. This offers lower cost as diodes are cheaper than transistors, and simpler control, because only one output drive control circuit is needed. This approach works well up to about 3,000 watts load. Above this level, the advantages of the diode bridge method diminish because both localized heat dissipation and diode cost start to rise rapidly.

The ability to use inexpensive diodes in parallel to obtain higher amperage handling, or to connect dimmer sections in parallel for higher amperage, more flexibility, or N+1 redundancy (for increased reliability in critical situations, a load which would require N dimmer sections can be powered by N+1 sections; if one section fails, the load can continue to operate) would be a great improvement in flexibility, cost reduction and reliability.

OBJECTS AND SUMMARY OF THE INVENTION

It is an object of the invention to provide improvements for phase-controlled dimming systems which can be used separately, or combined for maximum benefit. These improvements include: more stable voltage output as line voltage varies; more stable voltage output at the load in spite of voltage drops on long wire connections between the dimmer and the load; reduction of audible lamp noise; overcurrent sensing at very low current levels; and overcurrent limiting very near the rated maximum load. The operation of the improvements may be better understood by reference to the following description and drawings.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawing in which like reference numerals identify like elements, and in which:

FIG. 15 show the waveform as effected by the transition control circuits of FIGS. 6 and 7;

FIG. 16 shows the current sharing waveforms as they would exist without the current sharing circuits of FIG. 8;

DETAILED DESCRIPTION OF THE ILLUSTRATED EMBODIMENT

Figure 6:
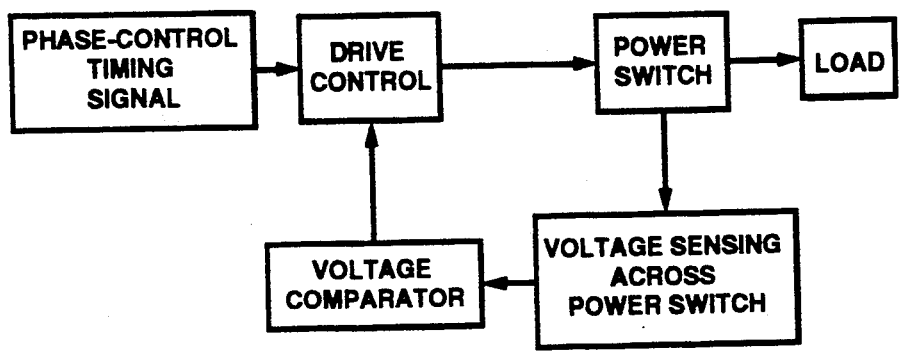
FIG. 6 is a block diagram of a first transition control circuit portion of the invention.
Figure 7:
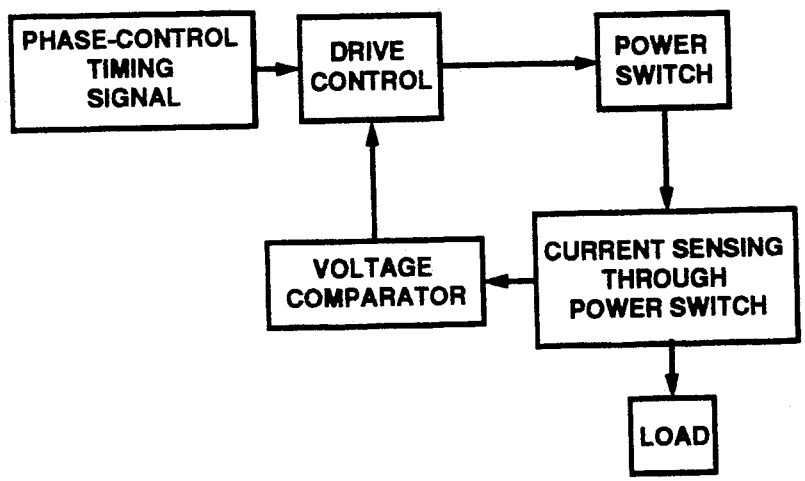
FIG. 7 is a block diagram of a second transition control circuit portion of the invention.
Figure 8:
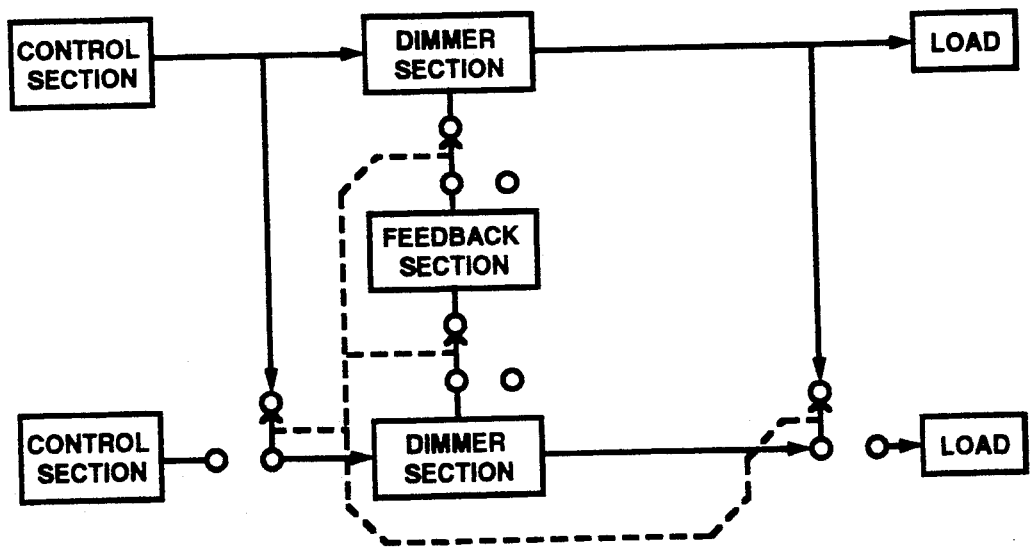
FIG. 8 is a block diagram of a current-sharing circuit portion of the invention.
Figure 9:
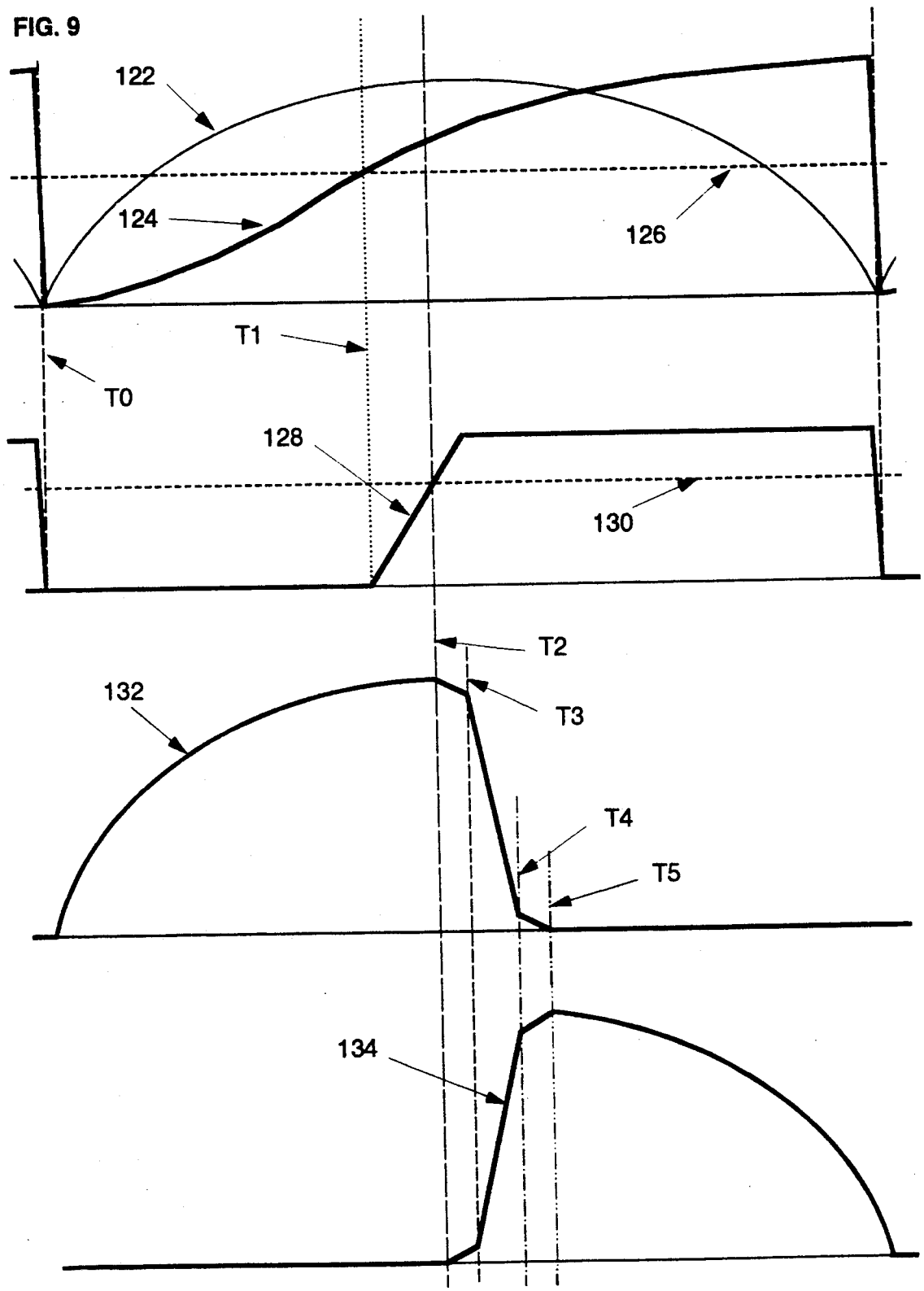
FIG. 9 is a graph of normal timing signals and output signal waveform produced at the load under normal conditions by the circuit of FIG. 1.
Figure 17A:
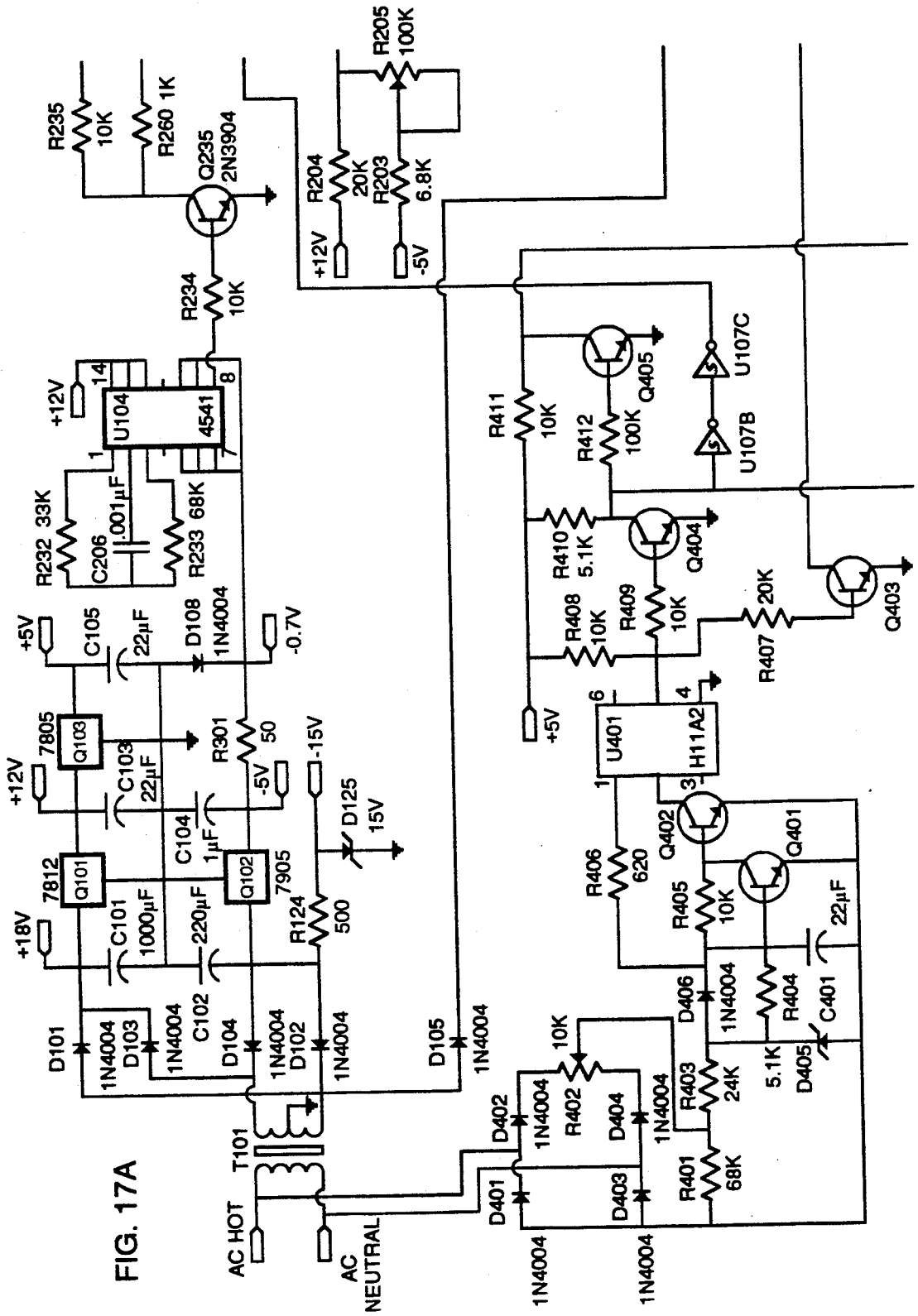
FIGS. 17A, B, C and D taken together in the manner shown in FIG. 17D, form a schematic circuit diagram of a timing circuit portion of the invention.
Figure 17B:
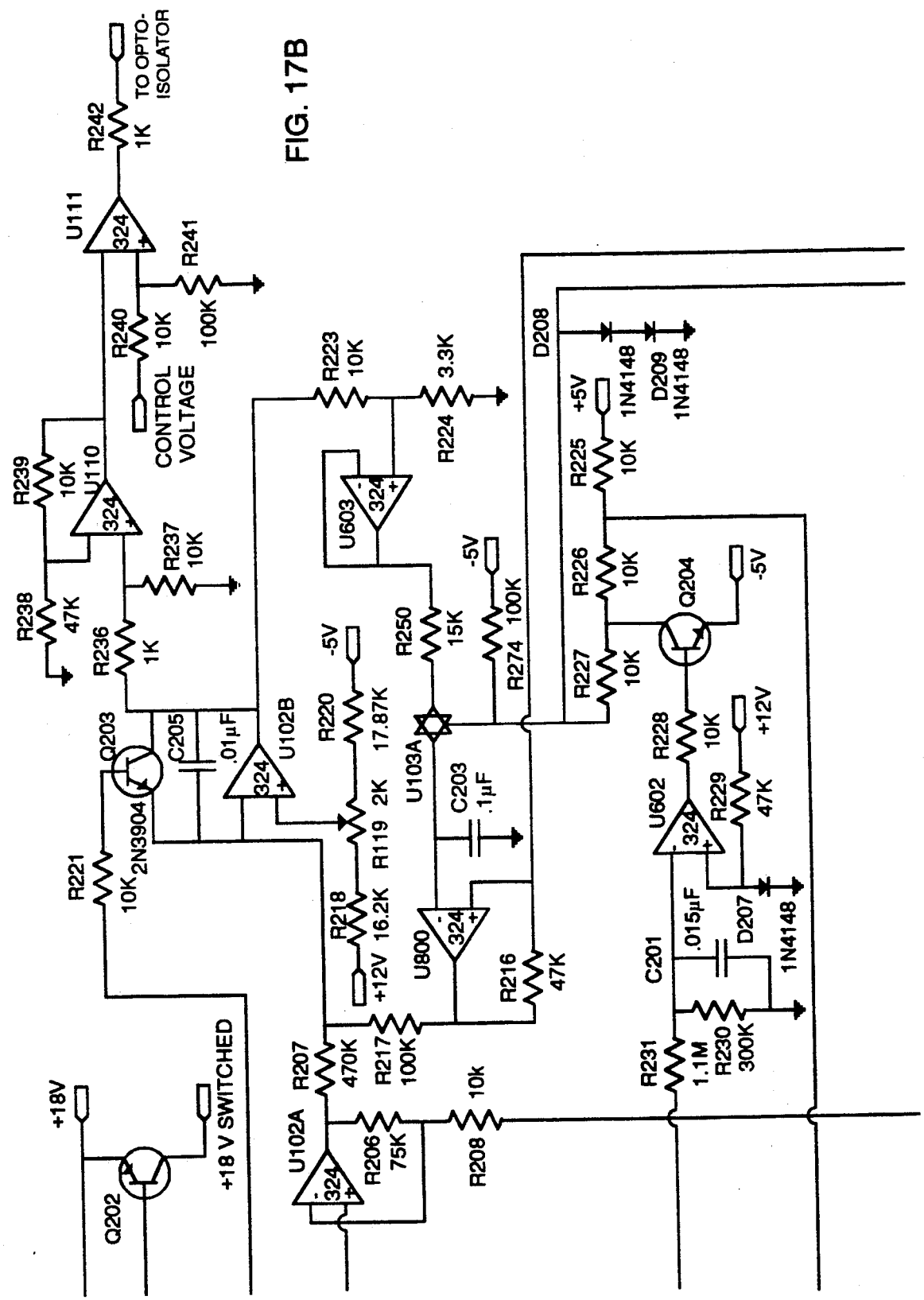
Figure 17C:
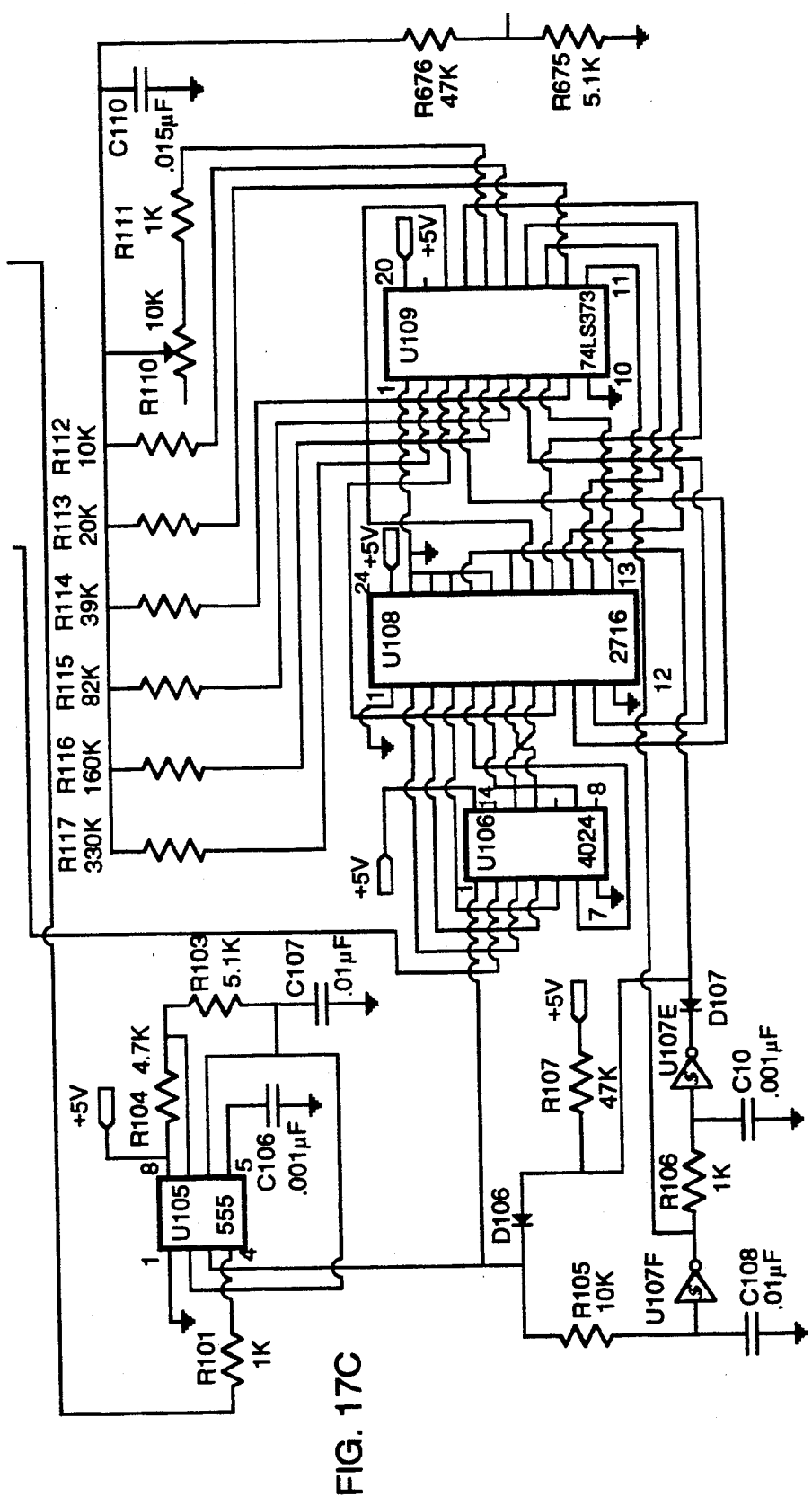
Figure 17D:
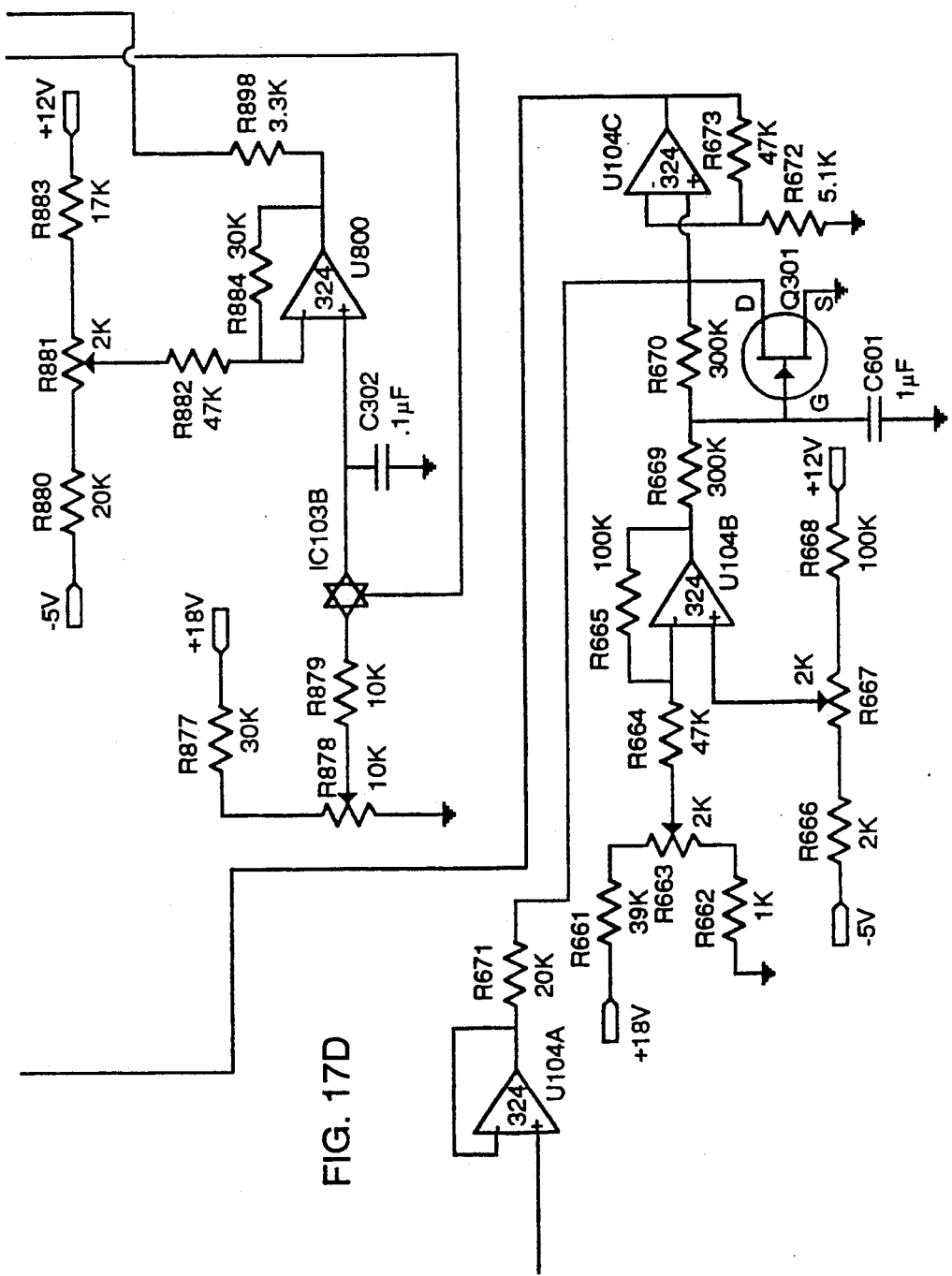

Details of a preferred embodiment of the circuits shown in block form in FIGS. 1-7 are shown in FIGS. 8, 17A, B, C and D (hereinafter referred to as FIG. 17) and 18A, B, C and D (hereinafter referred to as FIG. 18).

LINE VOLTAGE REGULATION

Figure 1:
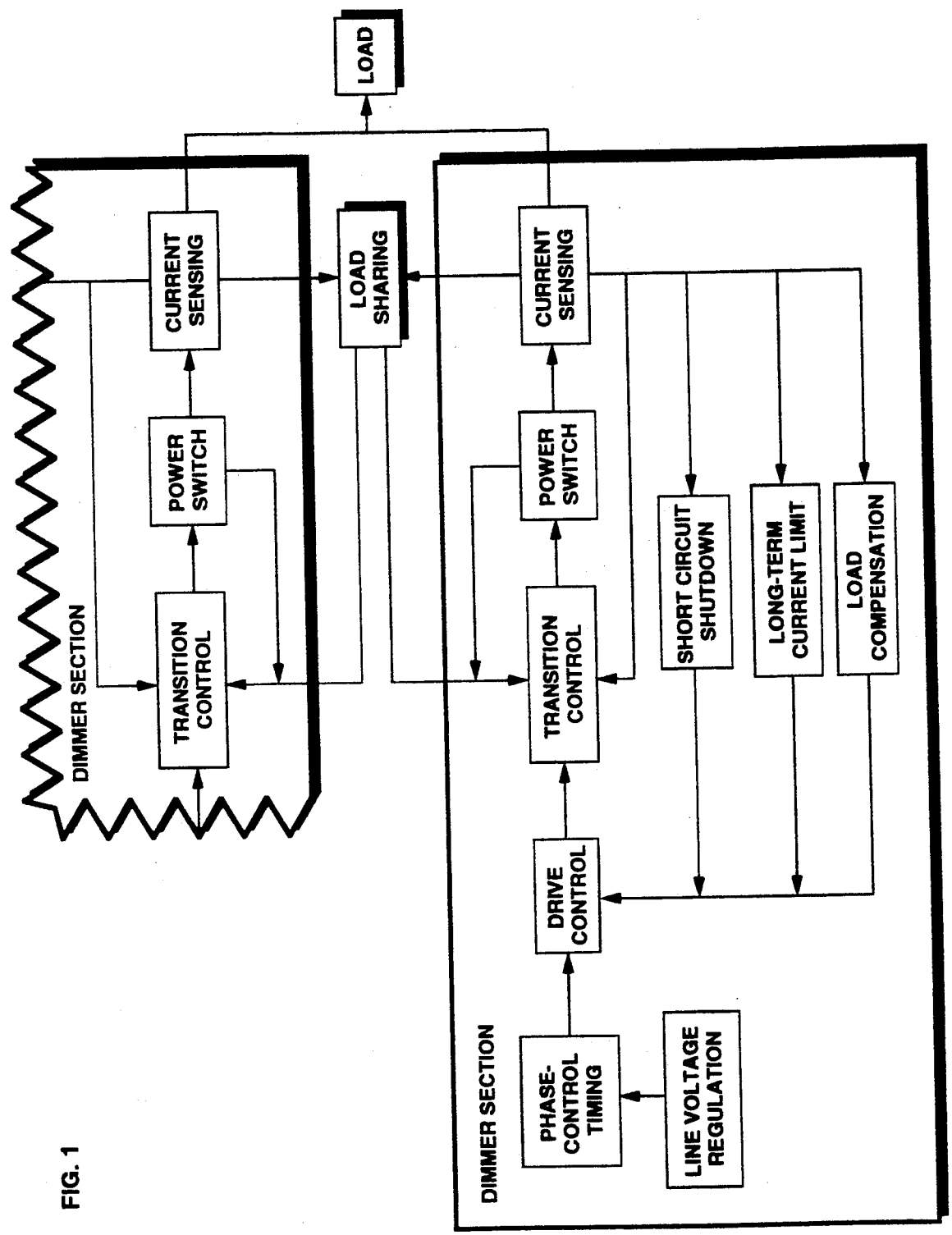
FIG. 1 is a block diagram of a improved semiconductor-controlled power control system in accordance with the invention.
Figure 2:
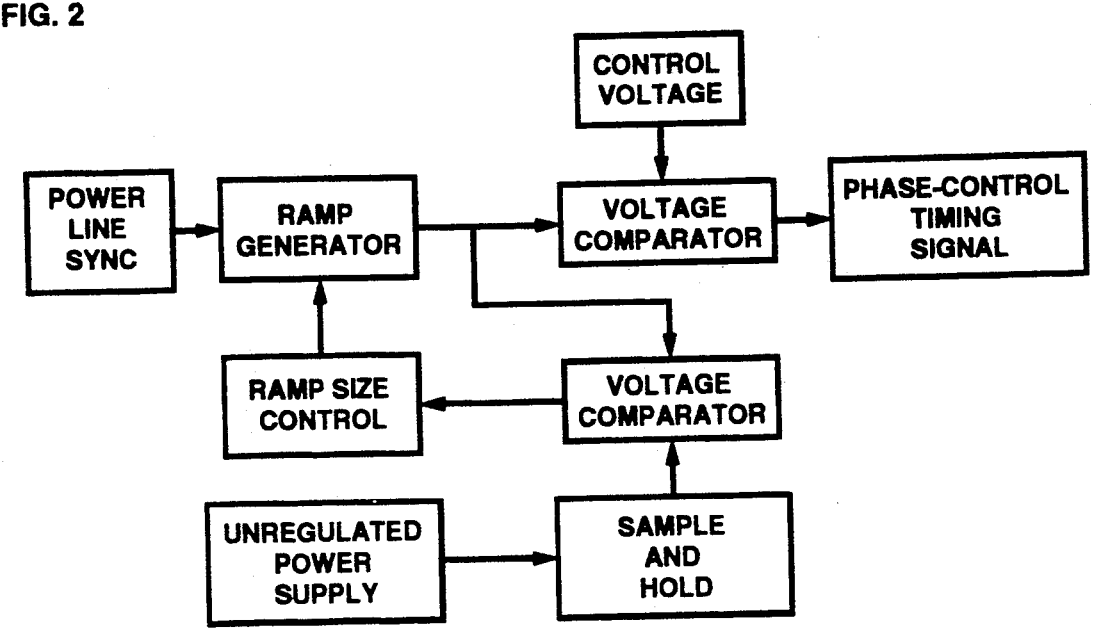
FIG. 2 is a block diagram of a line voltage regulation circuit portion of the invention.
Figure 10:
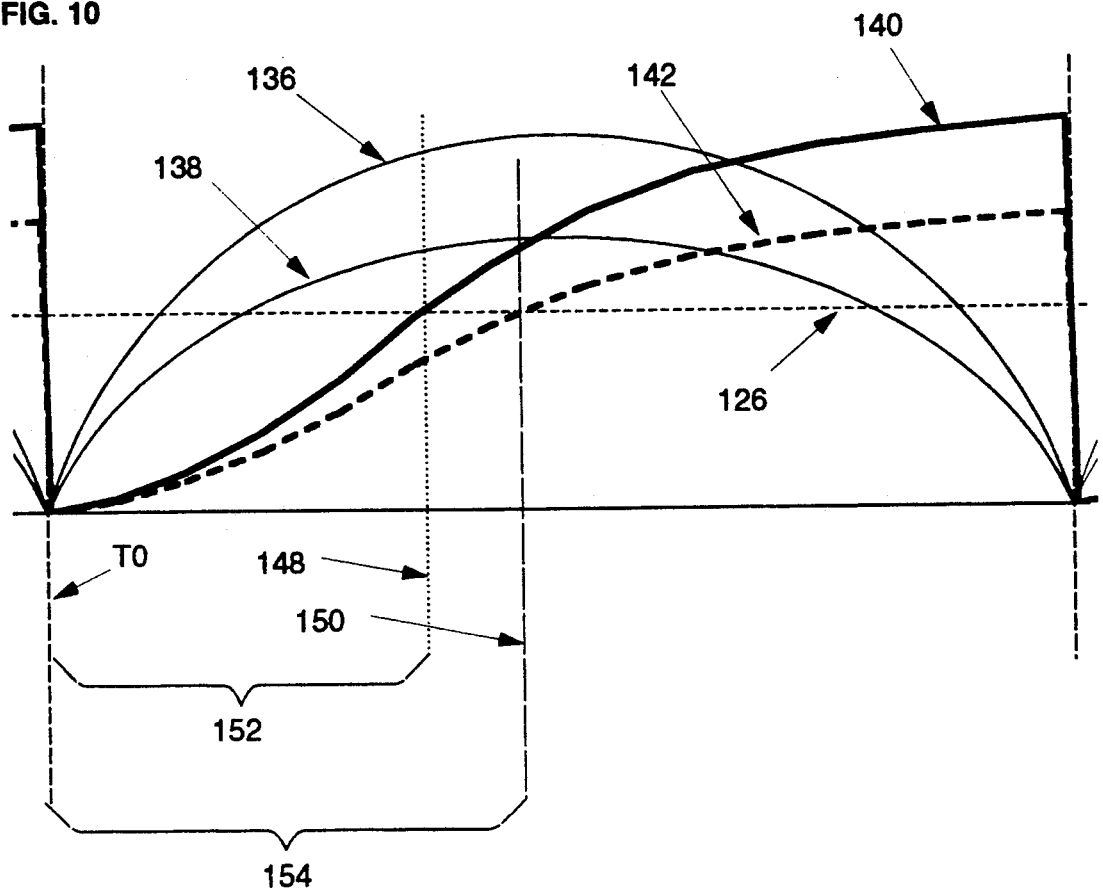
FIG. 10 shows the waveform as effected by the line voltage regulation circuit of FIG. 2.

Referring to FIGS. 1, 2 and 10, the timing control circuit of the improved dimmer of the present invention employs a timing ramp synchronized to the power line, and compares this ramp to a control voltage selected by a suitable lighting control to generate a signal which turns on the semiconductor power switch for the desired portion of each AC cycle. The shape of the timing ramp is complex because many of the elements which it coordinates are nonlinear. 1) The input voltage is constantly changing, due both to its sinusoidal nature and to utility- and load-related variations. 2) The brightness of the lamp filament varies approximately as the 3.7th power of the RMS output voltage. 3) The most commonly used curve of brightness as related to control position in theatrical and studio applications is a square law.

Given the complex timing relationships involved, it is not unusual for digital circuitry to be employed in generating accurate timing. This timing has been done computationally, with one or more microprocessors which evaluate the power and control input signals and generate a timing ramp or directly switch each dimming channel on or off at the proper times. The timing has also been done with use of EPROMS which store a digital representation of the proper curve and employ a digital-to-analog converter to produce the curve. Both of these means require the use of high-frequency clock and signal pulses to produce sufficient resolution to make the digital steps small enough to be unobjectionable.

Referring briefly to FIG. 17, the timing ramp in the present invention employs an EPROM (U108), but, unlike prior art dimmers, the digital output is in the form of an offset current for the integrator (U110) which generates the timing ramp. This method directly converts the stepwise nature of the digital circuitry to a smoothly varying ramp voltage, and allows the maximum clock frequency employed to be less than 10 Kilohertz. This also has the significant advantage of operating below the frequency limit at which the circuitry may be subject to testing by the Federal Communications Commission, which is an expensive and often time-consuming process.

In addition to the curvature of the ramp provided by the EPROM circuit, the amplitude of the ramp must be modified to compensate for changes in overall line voltage, in order to adjust the duty cycle of the output as the line voltage changes. If the line voltage falls, the duty cycle of the output must increase (from T1 to T1' of FIG. 10) in order to maintain the RMS output voltage at the desired level, and vice versa. A number of methods may be used to sense the line voltage; each has advantages and disadvantages. The two most important factors in such sensing are speed of response and accuracy. With relatively undistorted sinewave input waveform, good accuracy can be obtained by rectifying a low-voltage sample of the line voltage and using a low-pass filter to obtain a DC voltage level related to the RMS line voltage. This would yield sufficient accuracy, but a very long time constant must be used to eliminate ripple on the DC voltage level. The long time constraint will slow down the response of the system to changes in the line voltage.

A sample-and-hold (S/H) circuit can provide both quick response and accuracy. Using a full-wave rectified signal as a line voltage reference minimizes the ripple present on the voltage reference, but, if the reference voltage is sampled each half-cycle, an undesirable effect occurs. The system response can become so rapid that overshoot and "hunting" take place on alternate half-cycles. If the ramp voltage on one half-cycle is low, a quick response can cause the ramp voltage on the next half-cycle to be high, which causes the ramp voltage on the next half-cycle to be low again, and so on. This rise and fall on succeeding half-cycles introduce a DC offset into the voltage output to the load. This is very undesirable, especially at high power levels. If the response is slowed down to minimize this hunting, the advantages of the S/H circuit are reduced or lost. The present invention eliminates the DC offset while retaining fast response by sampling the reference voltage only once each full cycle and holding the sampled voltage until the same time in the next full cycle. Any hunting which takes place is identical over a complete cycle, so no DC offset is introduced in the output voltage.

LOAD COMPENSATION

The dimmer employs a circuit which senses the current drawn by the load.

Figure 3:
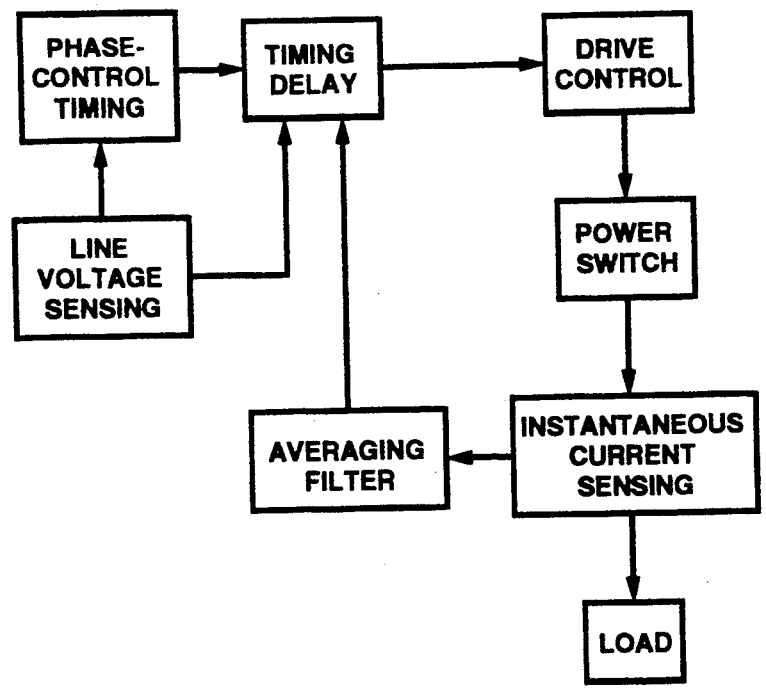
FIG. 3 is a block diagram of a load compensation portion of the circuit of the invention.
Figure 11:
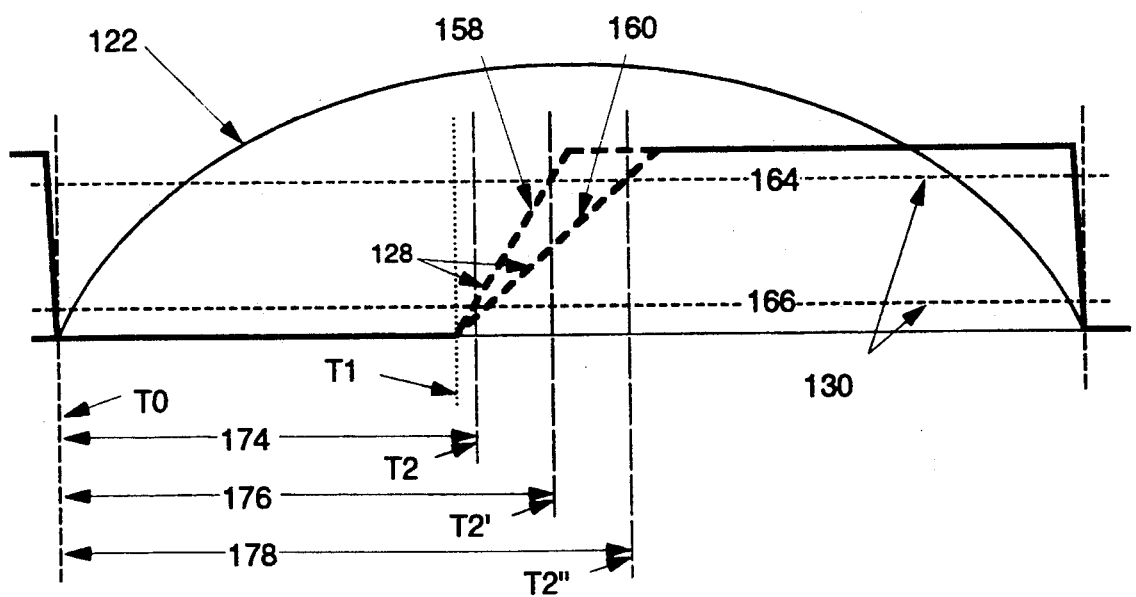
FIGS. 11 and 12 show the waveform as effected by the load compensation circuit of FIG. 3.
Figure 12:
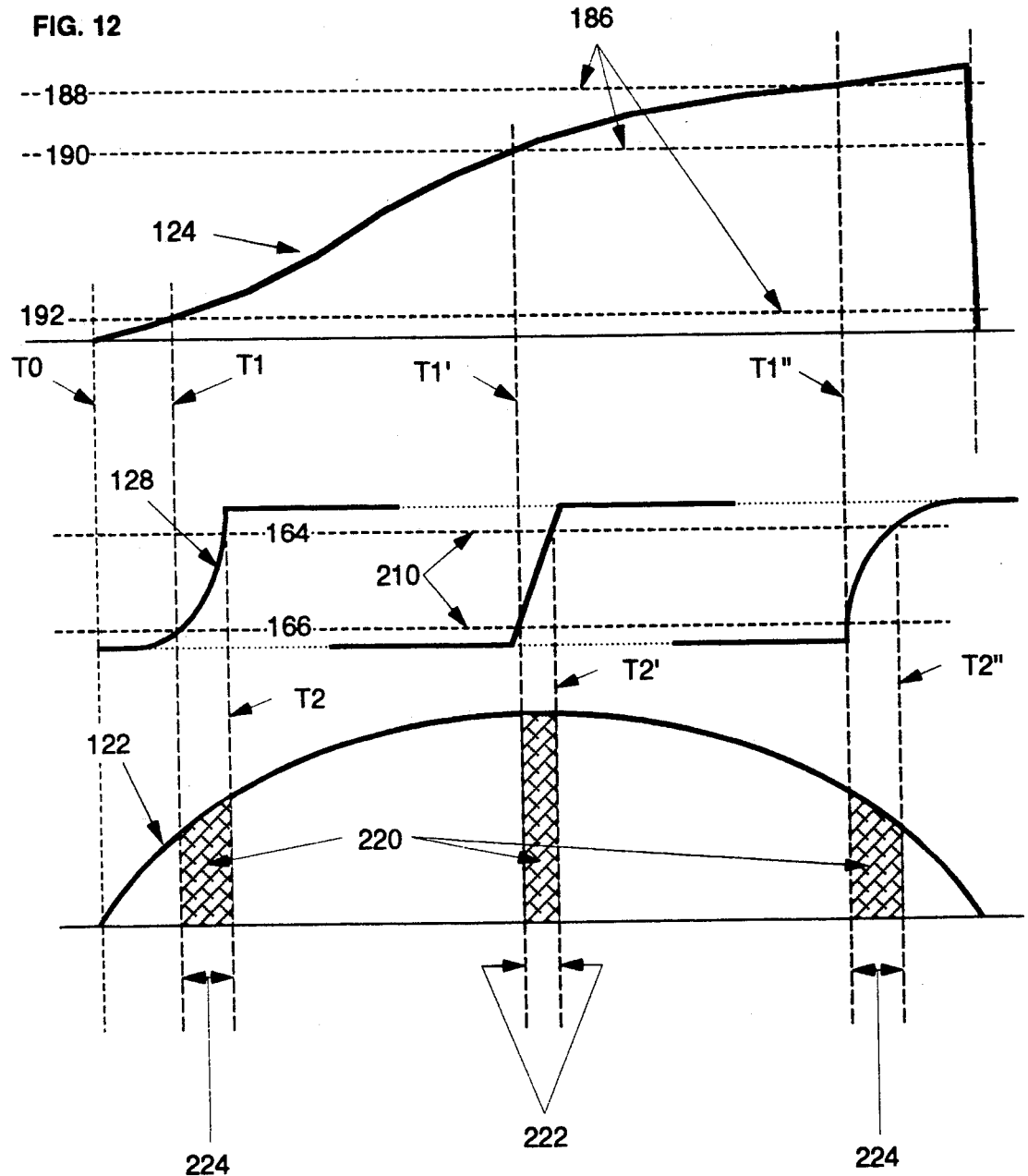

Referring to FIGS. 3, 11 and 12, the current sense signal is filtered to provide a voltage proportional to the average current drawn by the load. This voltage is compared to a ramp signal shaped in such a way that an increase in load current causes a delay in the switching-off of the power semiconductor(s), thus raising the output voltage at the dimmer. The amount of delay is variable, and is calibrated to compensate for the voltage loss in the wire between the dimmer and its load.

LONG-TERM CURRENT LIMITING

Figure 4:
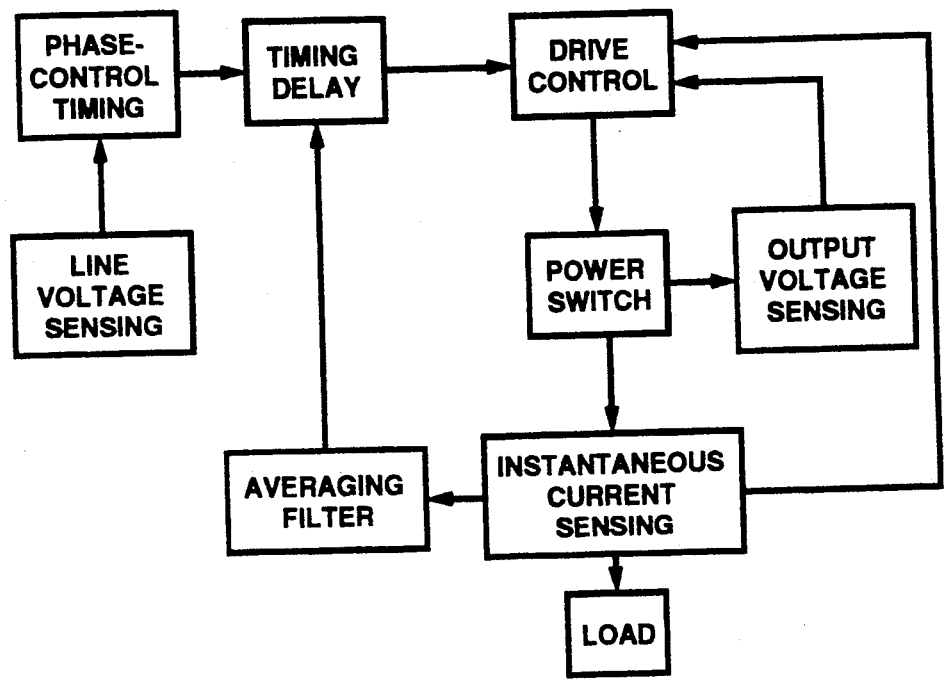
FIG. 4 is a block diagram of long-term current limiting circuit portion of the invention.
Figure 13:
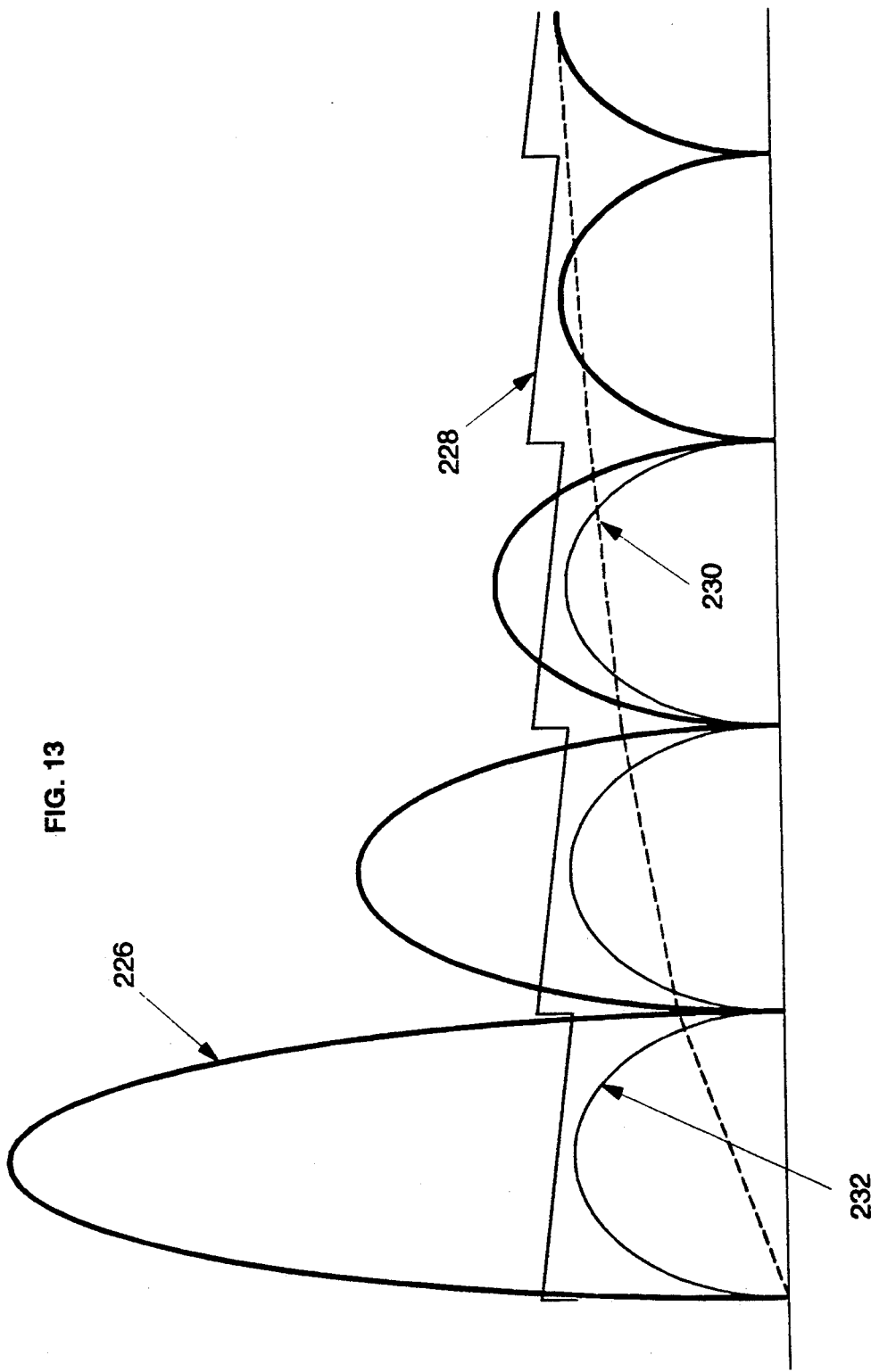
FIG. 13 shows the waveform as effected by the long-term current limiting circuit of FIG. 4.

Referring to FIGS. 4 and 13, the filtered current sense signal is also compared to a threshold voltage set so that an attempt to draw more than the average rated power will result in current limiting being activated. The time delay in the response of the filtered current sense signal allows the current limiting to be set to the rated power level without being activated by the inrush current typical of incandescent lamp loads. This ability to set the long-term current limiting at the rated power level has the benefit of preventing incremental increases in load current to cause the long-term current limiting at the rated power level has the benefit of preventing incremental increases in load current to cause the long-term current to rise high enough to cause a nuisance trip of the circuit breaker or overload the power switch, as was possible with previous art current limiting dimmers which required that the trip current be set high enough that the warming of incandescent loads not be slowed excessively by current limiting.

SHORT-CIRCUIT PROTECTION

Figure 5:
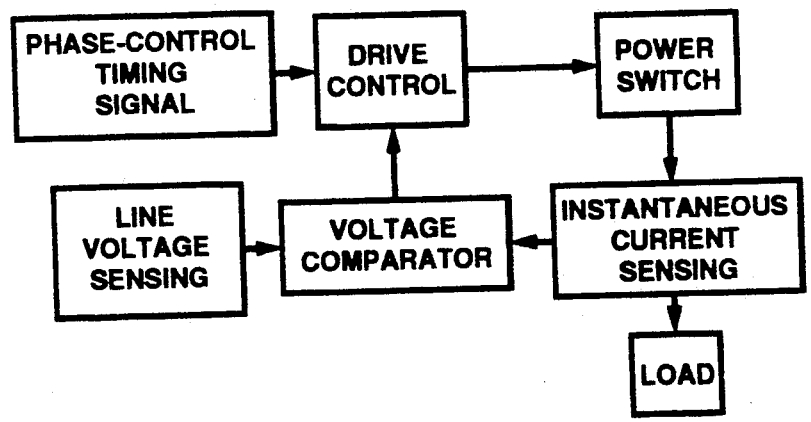
FIG. 5 is a block diagram of a short-circuit shutdown circuit portion of the invention.
Figure 14:
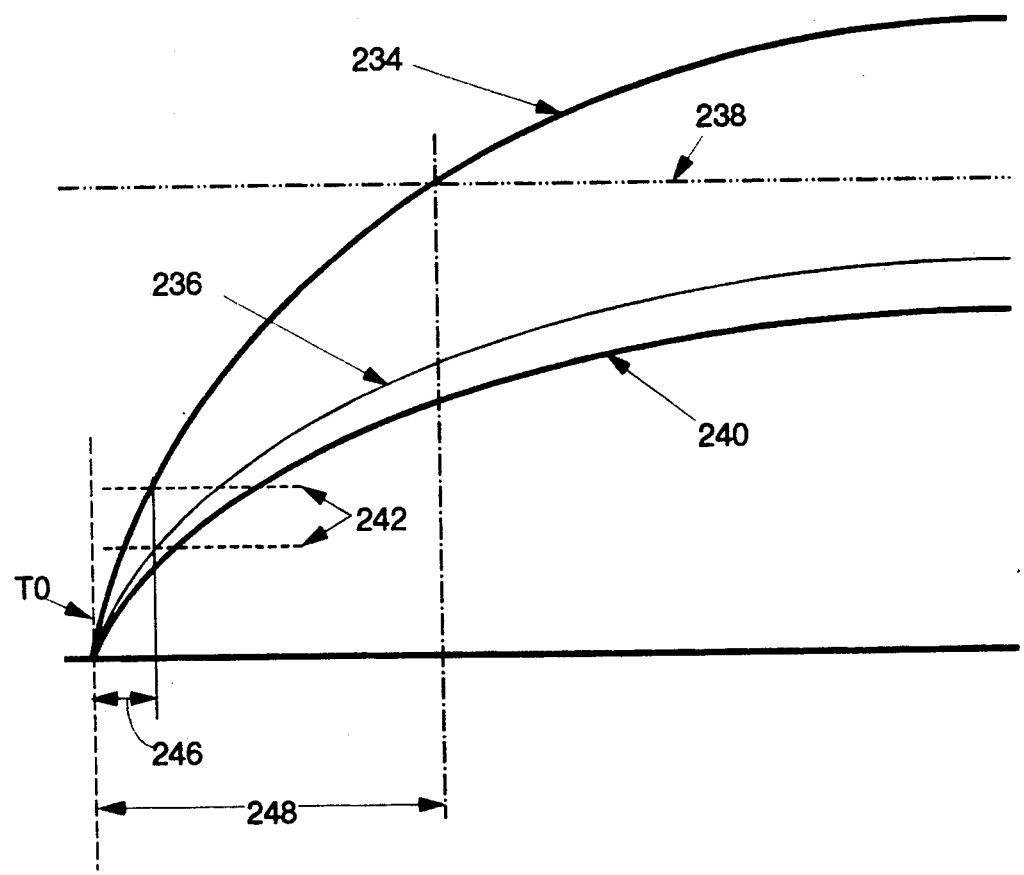
FIG. 14 shows the waveform as effected by the short-circuit shutdown circuit of FIG. 5.

Referring to FIGS. 5 and 14, when the current limiting of the present invention is activated, current is cut off for the remainder of each half cycle of the power line voltage, and is reset each time the power line voltage crosses zero. This allows the immediate restoration of power when an overload is removed, but allows repetitive application of high current every half cycle.

The current limiting of the present invention improves upon this by comparing the instantaneous current to the instantaneous line voltage, starting at or near the zero crossing point. Because the current draw is proportional to the applied voltage (for a substantially resistive load), a heavy over current condition is sensed, and reacted to, very early in each cycle, resulting in much lower peak short-circuit currents that previous dimmers. Average current into a short circuit is limited to a fraction of the normal maximum current, and the power control semiconductors run quite cool. The system can thus withstand a short circuit or heavy overload for an indefinite period without overheating or damage.

ACOUSTIC LAMP FILAMENT NOISE REDUCTION

Referring to FIGS. 6, 7 and 15, improvements in acoustic noise reduction without the drawbacks typical of previous phase-control dimmers are desirable, and are possible by modifying the shape of the load current waveform at the points which generate the most noise. These points are those at which the second derivative of the current waveform are the greatest, either positive or negative, and occur at the beginning and end of the switching time. The power dissipation in the power semiconductor during the transition time is least at these points, because either the voltage across the power semiconductor is near zero (between T2 and T3 of FIG. 15), or the current (between T4 and T5 of FIG. 15) is near zero. By modifying the rate of current change at the points of greatest noise generation, the rate of current change in the middle of the transition can be increased without causing more filament noise. Because the most heat dissipation occurs near the center of the transition, the overall dissipation is reduced without the penalty of increased noise.

Filament noise is especially loud when the duty cycle of the dimmer output voltage is very low. In this condition, the lamp filament has a maximum amount of time to cool before the next pulse of current. In the present invention, transition control circuitry also lengthens the transition time when the line voltage at the moment of transition is low. This corresponds to either a very low or a very high duty cycle. Because the line voltage is low during this period, the transition time can be lengthened significantly without a substantial penalty of increased heat dissipation.

USE OF DIMMER SECTIONS OPERATING IN PARALLEL

Referring to FIGS. 8 and 16, dimmer sections can be operated in parallel if provisions are made for essentially equal current sharing between sections. Such provisions need to be made for two major periods. One of the periods is the time when the semiconductor power switches are fully on.

During the full-power period (between T0 and T2 in FIG. 16), many types of semiconductors, such as silicon diodes, bipolar transistors, SCRs and triacs require external balancing components. This is because such semiconductors exhibit decreased resistance to current flow as they heat up, so if one of a parallel group passes more current than the others in the group, its internal resistance will cause it to heat up more than the others and thus conduct even more current and heat up further, until the device is damaged or destroyed. This "thermal runaway" will then occur to each of the other parallel devices in turn. Semiconductors of this type can be described as having a negative Resistance/Temperature Coefficient (RTC). The most common method of balancing current in such circuits is by use of a low-value resistor in each current path. The increase in voltage drop across the resistor as the current in its path increases will tend to divert some current to other paths, so all paths share the current essentially equally.

Other types of semiconductors, such as Field Effect Transistors (FETs), exhibit an increase in resistance with an increase in temperature. This allows such semiconductors to be paralleled easily because, if one of the devices starts to conduct more current than the others, it will heat up and thus increase in resistance, which will tend to divert some current to other devices in the group and thus decrease its current flow and temperature. Thus, these semiconductors can form a stable parallel group, and can be described as having a positive RTC.

The other period of concern in assuring proper current sharing is the transition time between full current and no current (between T2 and T5 of FIG. 16). If some sections turn off or on significantly more quickly than other sections, extra current may be routed through those sections which are more fully on. This would result in those sections which carry extra current operating at significantly higher temperatures than the other sections. To minimize any differences between sections, a signal related to the changing current flowing through each dimmer section during the on/off transition is coupled to the other sections which are connected in parallel. This signal slows down sections which are transitioning more quickly than average, and speeds up those sections which are changing more slowly than average.

LINE VOLTAGE REGULATION (IN TIMING CIRCUIT)

Referring to FIGS. 10 and 17, the illustrated embodiment of the present invention uses a DC voltage level related to the AC line voltage as a basis for adjustment of the output duty cycle to compensate for changes in line voltage. The DC voltage is obtained from T101, D101 and D103, and only minimally filtered, by C106, for fast response. Using a full-wave rectified signal minimizes the ripple voltage, but, if the voltage is sampled each half-cycle, an undesirable effect occurs. The system response becomes so rapid that "hunting" takes place on alternate half-cycles and introduces a DC offset into the voltage output to the load. This is very undesirable, especially at high power levels. The present invention eliminates the DC offset by sampling only once each full cycle and holding the DC voltage until the same time in the next full cycle. The circuit of R320, R321 and C201 produce a pulse voltage at the negative input of U802 during the half-cycle in which D106 conducts. This pulse voltage decays during the next half-cycle. U802 and Q204 then strip off every alternate zero-crossing pulse from Q403, injecting one pulse for each full cycle to the control pin of bilateral switch U103A. A portion of the DC voltage present on C106 at that moment is connected to C302, which will store that voltage until the next timing pulse.

Essentially the same 60Hz timing pulse is used to sample the voltage of the timing ramp near its peak. This sample is stored in C20 and compared to the line voltage sample by U801. Any difference between the two samples results in a correction voltage at the output of U801 which is connected to the ramp generator U110 to bring the voltage of the timing ramp to the correct level for the line voltage.

If the ramp amplitude on a particular cycle is too high, a signal is produced which will reduce the ramp amplitude on following cycles. The inverse occurs if the amplitude is reduced compared to the line voltage reference. The combination of the line voltage sensing and ramp amplitude correction results in a self-correcting, self-adjusting ramp. The higher the line voltage, the greater the amplitude of the timing ramp.

The ramp signal is buffered by U110 and compared to a signal from the control console by comparator U111. The output of U111 is connected to the input diode of an optical isolator X2, which provides safety isolation between the low voltages of the timing circuits and the line voltages present in the power circuits. In the present embodiment, the control signal takes the form of an analog voltage proportional to the setting of the channel control set by the operator. The higher the control voltage is, the later in the half-cycle the switching-off of the power semiconductor takes place, leading to a higher RMS voltage at the load. Because the ramp amplitude varies with line voltage, the lower the line voltage is, the later in the half-cycle the switching-off of the power semiconductor takes place, leading to a steady RMS voltage at the load. Referring to FIG. 10, the transition is delayed from T1 to T1' at low line voltage.

LOAD COMPENSATION

Referring to FIGS. 9, 11, 12 and 18, the output of optocoupler X2 is connected through inverter/buffer transistor Q6 to the base of Q7, the control input of integrator U3A. When X2 is in its "on" state (between T0 and T1 current flows in the input diode), pin 5 of X2 is low. This turns off Q6, which turns on Q7, which connects the output of U3A to its negative input, so U3A acts as a voltage follower of its positive input. When X2 turns off, its pin 5 goes high, which turns on Q6, which turns off Q7. When this happens, a ramp voltage is developed at the output of the integrator U3A. This ramp voltage is used to develop a time delay between T1 and T2 in the on-to-off transition of the power control semiconductors. The instantaneous slope of the ramp voltage is related to the instantaneous line voltage, and is adjusted by potentiometers R28 and R20. This ramp voltage is connected to the positive input of comparator U3C.

The current which flows through the load X1 also flows through resistor R53, developing a voltage which is amplified by U4B and U3D, and filtered by network R58 and C11 to produce a voltage at the negative input to comparator U3C which is related to the average current flow. Loads which draw more current will produce a higher voltage at this point than loads which draw less current.

U3C compares the output of integrator U3A to the average-current-related voltage at C11. As the averagecurrent-related voltage at C11 rises due to increased current flow in the load X11, the turn-off time for power switches Q1-Q4 is further delayed to increase the voltage output of the dimmer to compensate for the greater voltage drop in the wires from the dimmer to the load X1. Referring to FIG. 11, for small loads the delay is T1-T2, while for large loads, the delay is T1-T2'. The greater the line loss for a particular load X1, the longer the rise time of integrator U3A is adjusted to be. This adjustment need only be done when the dimmer is installed. For a large load on a lossy line, the delay would be T1-T2".

LONG-TERM CURRENT LIMITING

Figure 18A:
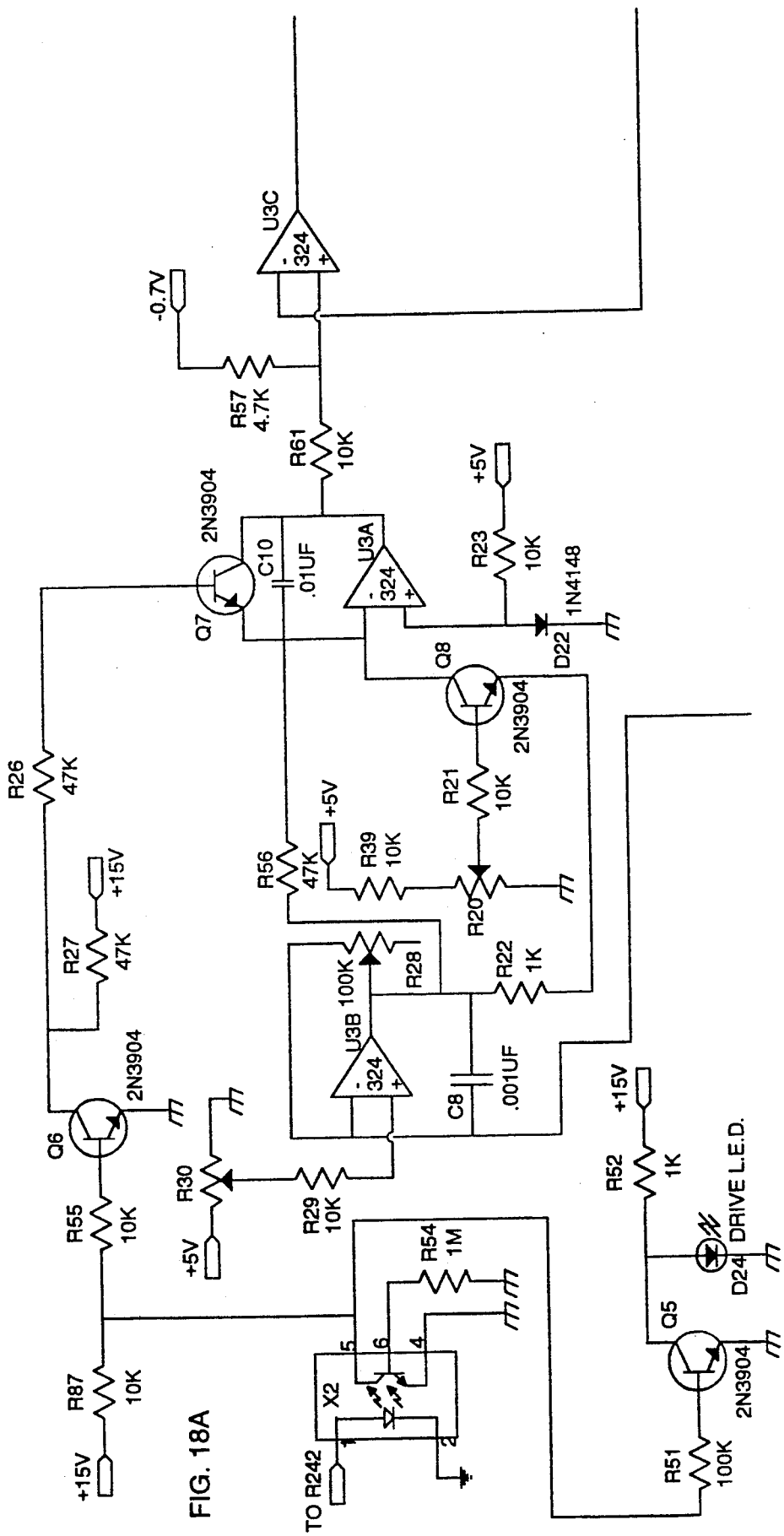
FIGS. 18A, B, C and D taken together in the manner shown in FIG. 18D, form a schematic circuit diagram of power circuit portions of the invention.
Figure 18C:
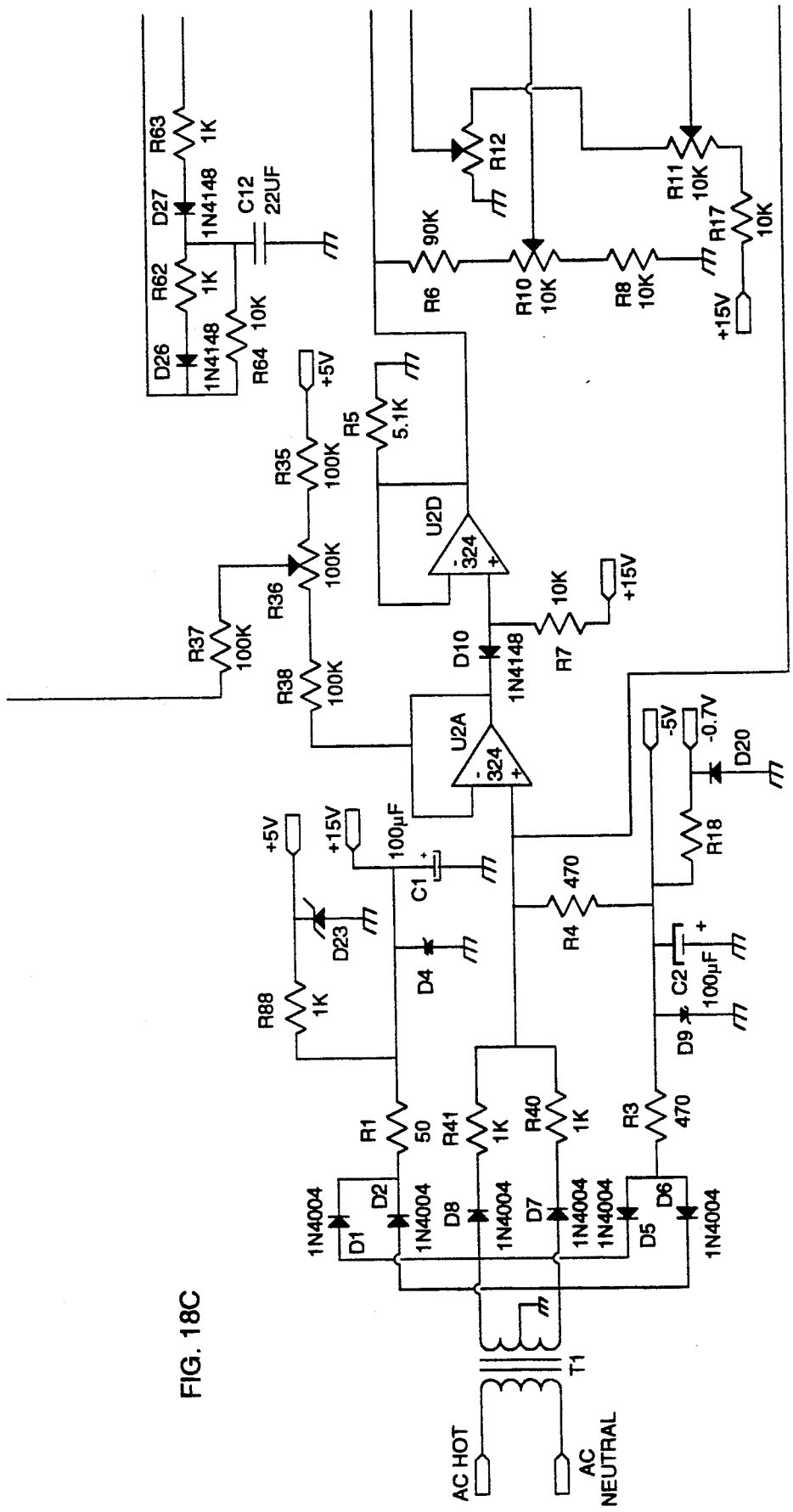
Figure 18D:
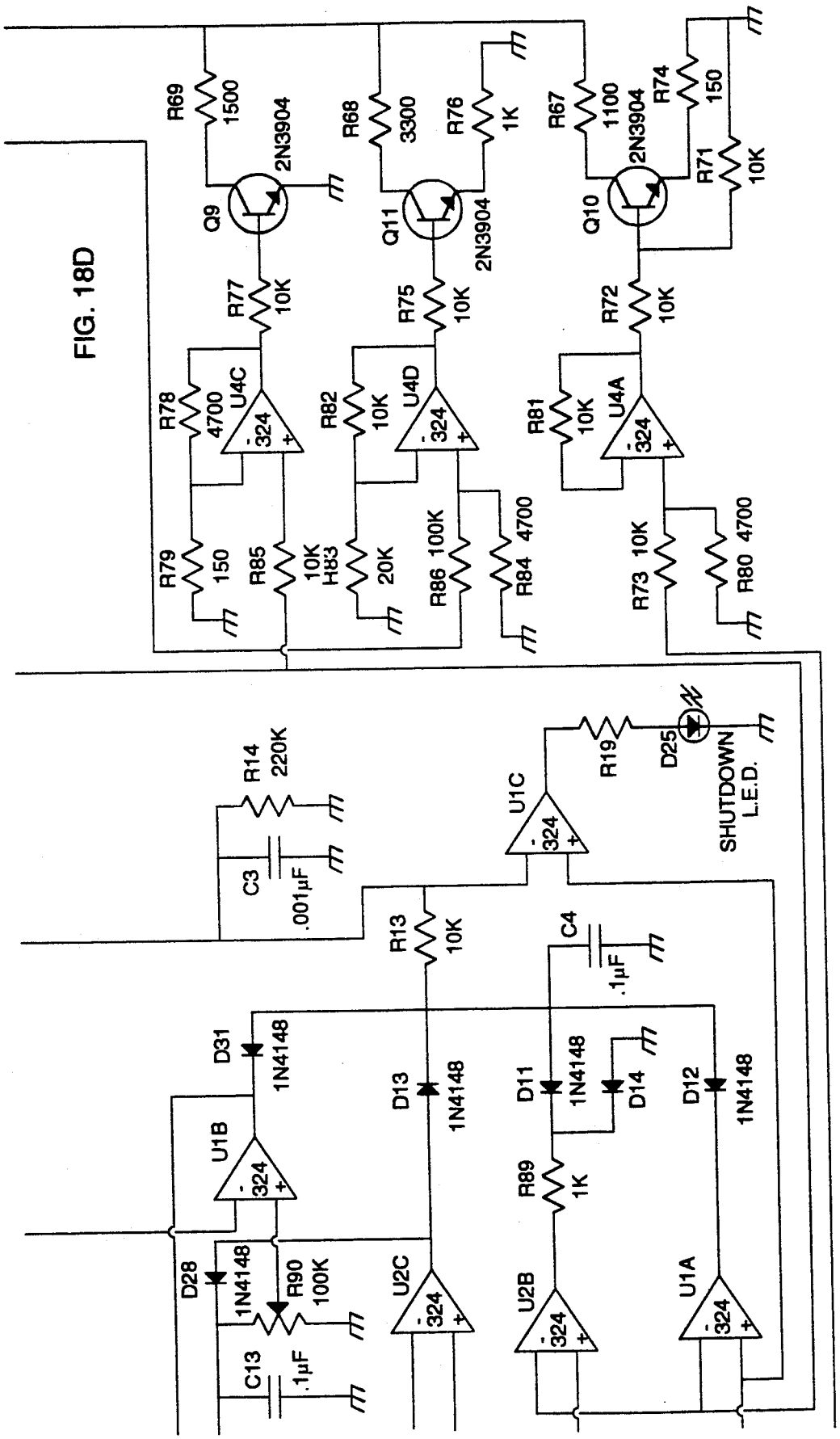
Figure 19A:
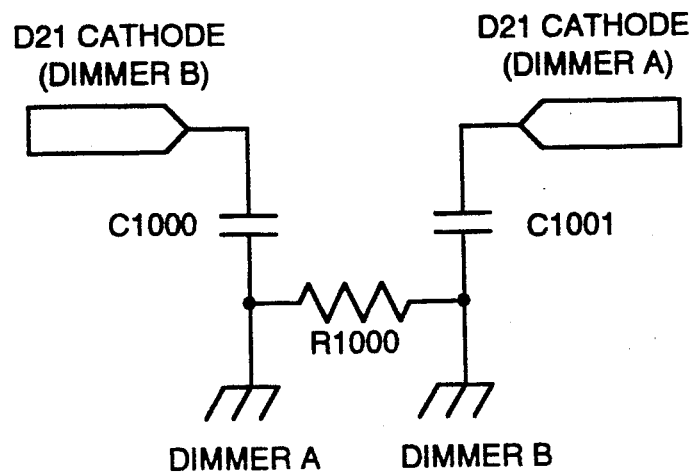
FIGS. 19A and 19B are schematic circuit diagrams of current sharing portions for connecting two dimmer sections and three dimmer sections, respectively.
Figure 19B:
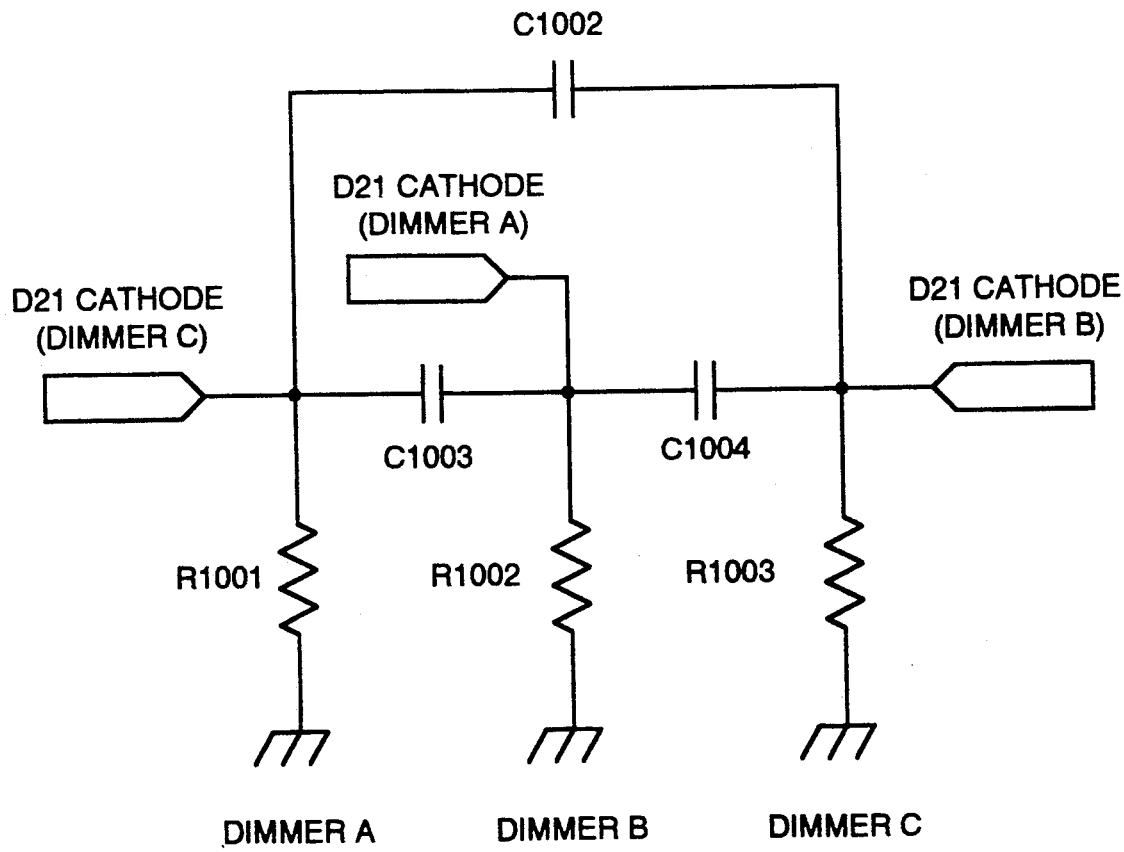

Referring to FIGS. 12 and 18, the average-current-related voltage at C11 is also connected to the negative input of comparator U1B, where it is compared to a sawtooth voltage signal at N805 which is synchronized to the AC line voltage. The signal at N805 is generated by the output of comparator U2C (which goes positive at each zero crossing of the line voltage) connected through D28 to N805 where the RC network of C13 and R90 causes the voltage to decay in a roughly sawtooth manner. The use of a sawtooth as the comparison voltage for the long-term current-related-voltage ensures that current overloads cause a progressive, controlled reduction in output duty cycle, with more cutting-back occurring with large overload currents.

The output of comparator U1B is also connected to the RC circuit of R14 and C3. If the output of U1B goes low, this RC circuit causes the sawtooth voltage at N805 to decay more quickly, which increases the amount of duty cycle reduction for a given overload current through load X1. This reduces the RMS current through the dimmer so the circuit breaker will not trip under any load condition.

BENDING OF RISE TIME (AT BEGINNING)

Referring to FIGS. 14 and 18, a sample of the voltage across the power switches Q1-Q4 is connected to the positive input of U4D. The output of U4D is connected through R75 to the base of Q11. When the power switches Q1-Q4 are on, the voltage across Q1-Q4 is near zero. As this voltage rises during the on-to-off transition, Q11 is turned on at T3, pulling more current from C14 and increasing the rate of transition. This change in the transition rate causes the transition to start slowly, thus reducing the acoustic noise of the lamp load filaments.

BENDING OF RISE TIME (AT END)

Referring still to FIGS. 14 and 18, a sample of the voltage derived from the instantaneous load current through X1 is connected to the positive input of U4C. The output of U4C is connected through R77 to the base of Q9. This keeps Q9 turned on except after T4 when the current through the load X1 is near zero. Near the end of the on-to-off transition, Q9 is turned off, pulling less current from C14 and reducing the rate of transition between T4 and T5. This change in the transition rate causes the transition to end slowly, thus reducing the acoustic noise of the lamp load filaments.

SHORT-CIRCUIT PROTECTION

Referring to FIGS. 13 and 18, the instantaneous level of the mains voltage at input (AC HOT) is represented by the output of transformer T1 and rectified by diodes D7 and D8 and buffered by U2A and U2D to become a positive-polarity signal at the output of U2D which is related to the absolute value of the instantaneous AC line voltage. An adjustable portion of this voltage signal is connected to the positive input of comparator U2B.

The current which flows through the load X1 also flows through resistor R53, developing a voltage which is amplified by U4B to become a signal at the output of U4B which is related to the instantaneous value of the load current. This signal is connected to the negative input of comparator U2B.

The output of U2B is connected through D11 to N900A, which is in turn connected through R13 to the positive input of comparator U1D, while the phase-control signal from the timing circuits is connected to the negative input of U1D. If at any moment, the voltage of the load current signal is larger than the voltage of the line voltage signal, the output of comparator U2B will drop and override the normal phase-control signal to shut down the power switch Q1-Q4. The levels of the load current signal and the line voltage signal are adjusted relative to each other by R10 so a load which would produce an overcurrent at maximum instantaneous line voltage will produce an overcurrent signal very early in the half-cycle. The current delivered to a short circuit will thus be much smaller than if it had to rise far enough to trip a maximum-current threshold set to protect the power switch components.

CURRENT SHARING

Referring again to FIG. 8 and FIG. 16, in order to connect two or more dimmer sections in parallel, several connections must be made between the sections:

1. The power outputs (POWER OUT) must be connected together so the load current is shared between the dimmer sections.

2. The control signals must be connected so the power switching semiconductors of each section change state simultaneously. In this embodiment, this is done by connecting the output of UID of the master section to the input of the thermal switch (SW1) of each of the slave sections. (If the slave sections can also operate independently, the output of UID of the slave section(s) is disconnected when the sections are slaved.)

3. For best current sharing, the transition between the conducting and nonconducting states of the power switching semiconductors Q1--Q4 between times T2 and T5 must be coordinated between sections. If the outputs of two or more dimmer sections are connected in parallel to increase the available power to the load, the voltages of the dimmer circuit commons will be vary similar, as long as the current is shared equally through each section. During the transition between conducting and nonconducting states, the current through the power switch semiconductors is extremely sensitive to their gate voltage. If one of the dimmer sections switches more slowly than the other(s), its current will be higher than the other(s), and its voltage at circuit common will be slightly higher than the other(s).

For example, if dimmer B (in FIGS. 8 and 16) switches more slowly than section A, the current through dimmer B will be greater than that through dimmer A., and the voltage at dimmer B circuit common will rise relative to dimmer A circuit common. This voltage increase at dimmer B circuit common will be coupled through C1001 to the control input (N5) of the dimmer A power switch circuit. The voltage decrease at dimmer A circuit common will be coupled through C1000 to the control input (N5) of the dimmer B power switch circuit. This slight voltage rise at N5 of dimmer A will cause dimmer A to conduct slightly more current and the slight voltage dip at N5 of dimmer B will cause dimmer B to conduct slight less current, thus bringing the dimmers back into balanced conduction. R 1000 connects the circuit commons together while allowing the voltage differences to exist between dimmer sections. The values of C1000, C1001 and R1000 are chosen so the impedance of the cross-coupling circuit is small relative to the impedance of the driving circuit at N5.

LINE VOLTAGE REGULATION (IN POWER CIRCUIT)

Line voltage regulation may also be done in the power circuit. For reverse phase-control dimmers, the base transition time is adjusted for the highest expected line voltage. As the line voltage decreases from this level, the transition time is delayed to increase the duty cycle for compensation.

For forward phase-control dimmers, the base transition time is adjusted for the lowest expected line voltage. As the line voltage increases from this level, the transition time is delayed to decrease the duty cycle for compensation.

BENDING OF RISE TIME WAVEFORM AT BEGINNING OF OFF-TO-ON TRANSITION USING THYRISTORS

Figure 20:
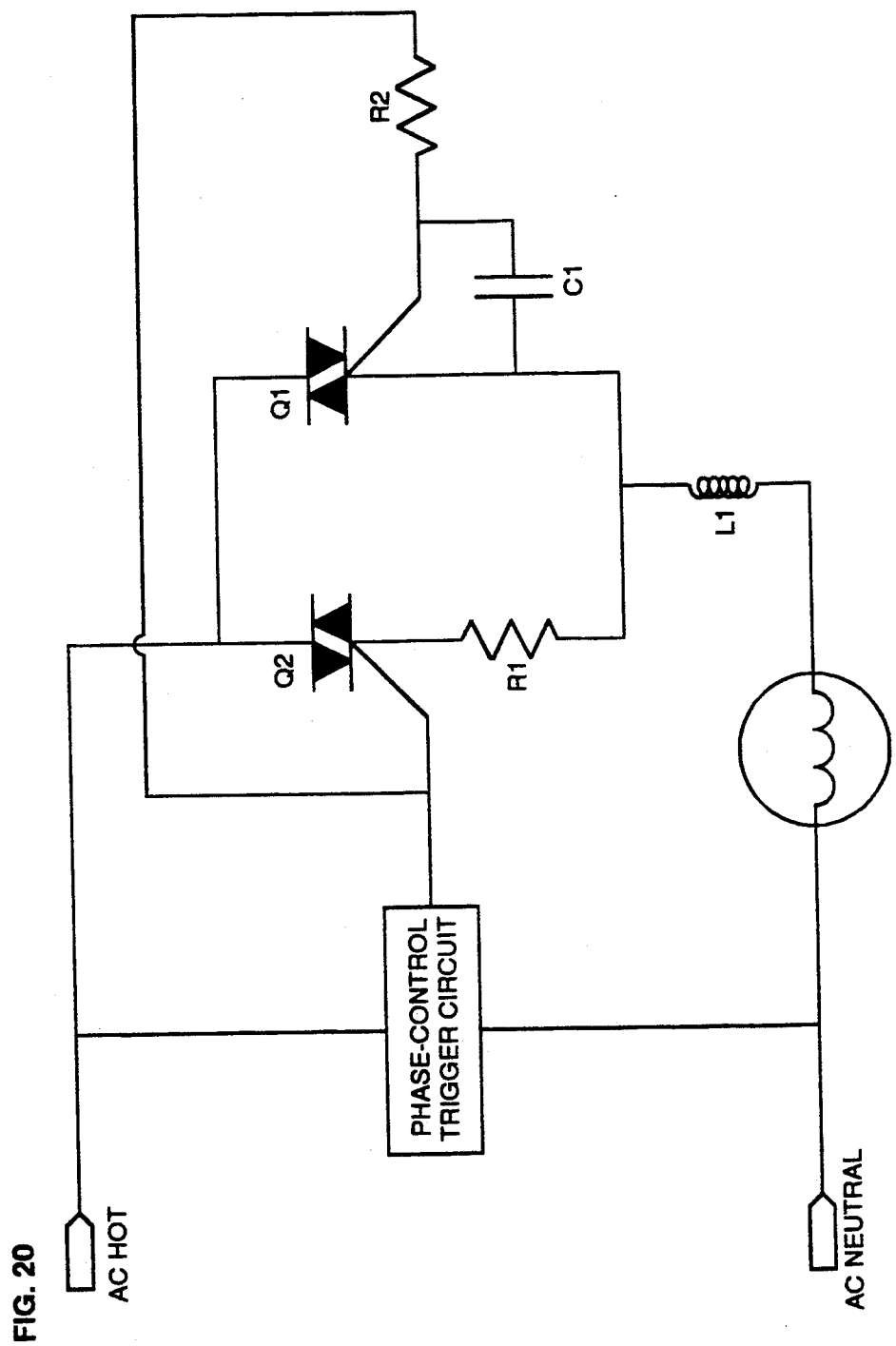
FIG. 20 is a schematic diagram of the power control section of a thyristor-based dimmer with rise time waveshaping for RFI and filament noise reduction.

Referring to FIG. 20, noise reduction at the start of the off-to-on transition of thyristor and choke phase controlled dimmers, similar to that available with the preferred embodiment, is also possible by use of a small thyristor and series resistor Q2 and R1 in parallel with the main thyristor Q1. Q2 is turned on slightly before Q1 because the combination of R2 and C1 will delay the turn-on pulse reaching Q1, causing the load current to start slowly. This allows the use of a smaller, lighter, less expensive choke than normally required for filament quieting and RFI reduction at a given load current. Inverse-parallel connected SCRs can be connected in a similar manner, with a primary and secondary SCR being used for each polarity of current flow.

TABLE I

| FIGURE REFERENCE NUMBERS | |
|---|---|
| 122 | A.C. LINE VOLTAGE |
| 124 | PHASE-CONTROL TIMING RAMP (OUTPUT OF U102B) |
| 126 | CONTROL VOLTAGE FROM CONTROL CONSOLE (AT + INPUT OF U111) |
| 128 | LOAD COMPENSATION TIME DELAY RAMP (AT OUTPUT OF U3A) |
| 130 | AVERAGE LOAD CURRENT LEVEL SIGNAL (VOLTAGE AT C11) |
| 132 | INSTANTANEOUS LOAD CURRENT |
| 134 | INSTANTANEOUS VOLTAGE ACROSS POWER SWITCH |
| 136 | NOMINAL A.C. LINE VOLTAGE |
| 138 | LOW LINE VOLTAGE |
| 140 | NOMINAL PHASE-CONTROL TIMING RAMP (OUTPUT OF U102B) |
| 142 | LOW LINE PHASE-CONTROL TIMING RAMP (OUTPUT OF U102B) |
| 148 | T1 (NOMINAL LINE) |
| 150 | T1' (LOW LINE) |
| 152 | NOMINAL LINE POWER SWITCH ON-TIME |
| 154 | LOW LINE POWER SWITCH ON-TIME |
| 158 | R28 ADJUSTED FOR LESS LOSS |
| 160 | R28 ADJUSTED FOR MORE LOSS |
| 164 | LARGE CURRENT |
| 166 | SMALL CURRENT |

TABLE I-continued

| FIGURE REFERENCE NUMBERS | |
|---|---|
| 174 | ON-TIMES: SMALL LOAD/LOW-LOSS LINE |
| 176 | ON-TIMES: LARGE LOAD/LOW-LOSS LINE |
| 178 | ON TIMES: LARGE LOAD/HIGH-LOSS LINE |
| 186 | VAROIUS BRIGHTNESS CONTROL VOLTAGES ($V_c$) FROM CONTROL CONSOLE |
| 188 | $V_c''$ (BRIGHT) |
| 190 | $V_c'$ (MEDIUM) |
| 192 | $V_c$ (DIM) |
| 164 | LARGE CURRENT |
| 166 | SMALL CURRENT |
| 210 | AVERAGE CURRENT LEVEL SIGNALS (VOLTAGE AT C11) |
| 220 | INCREASED POWER TO COMPENSATE FOR DROP IN LINE TO LOAD |
| 222 | HIGHER INSTANTANEOUS LINE VOLTAGE - SHORTER DELAY TIME |
| 224 | LOWER INSTANTANEOUS LINE VOLTAGE - LONGER DELAY TIME |
| 226 | INSTANTANEOUS INRUSH CURRENT OF INCANDESCENT LAMP |
| 228 | MAXIMUM CURRENT THRESHOLD (AT + INPUT OF U1B) |
| 230 | LONG-TERM CURRENT SIGNAL (AT − INPUT OF U1B) |
| 232 | MAXIMUM SUSTAINABLE INSTANTANEOUS CURRENT |
| 234 | SHORT-CIRCUIT CURRENT SIGNAL (AT − INPUT OF U2B) |
| 236 | LINE VOLTAGE COMPARISON SIGNAL (AT + INPUT OF U2B) |
| 238 | CURRENT TRIP POINT FOR POWER SWITCH PROTECTION |
| 240 | MAXIMUM NORMAL CURRENT SIGNAL (AT − INPUT OF U2B) |
| 242 | DIFFERENCE THRESHOLD OF SHORT-CIRCUIT DETECTION |
| 246 | ON-TIME WITH NEW SHORT-CIRCUIT PROTECTION |
| 248 | ON-TIME WITH PREVIOUS SHORT-CIRCUIT PROTECTION |
| 254 | AVERAGE RATE OF CURRENT CHANGE ($\phi$) |
| 266 | POWER SWITCH VOLTAGE THRESHOLD |
| 268 | POWER SWITCH CURRENT THRESHOLD |
| 270 | STANDARD RISETIME |
| 272 | EXTENDED RISETIME FOR EXTRA NOISE REDUCTION WITH LOW DUTY CYCLE |
| 274 | Q9 & Q10 TURN ON |
| 276 | Q11 TURNS ON |
| 278 | Q9 TURNS OFF |
| 280 | TRANSISTORS WHICH SHUNT POWER SWITCH GATE VOLTAGE |
| 290 | TOTAL INSTANTANEOUS LOAD CURRENT |
| 294 | TIME EXPANSION TO SHOW DETAIL OF TRANSITION |
| 296 | UNCORRECTED CURRENT SHARING BETWEEN DIMMER SECTIONS |
| 298 | CURRENT THROUGH DIMMER SECTION A |
| 300 | CURRENT THROUGH DIMMER SECTION B |
| 316 | VOLTAGE DIFFERENCE BETWEEN CIRCUIT COMMONS OF DIMMER SECTIONS A & B |

The invention is claimed as follows:

1. An improved semiconductor-controlled power control system comprising: power supply means for receiving an AC line voltage and for converting said AC line voltage to predetermined rectified AC and DC power supplies; phase control timing circuit means coupled to said power supply means for generating and shaping electrical timing signals; drive control circuit means response to said electrical timing signals for producing predetermined drive signals; semiconductor power switching means for delivering power to a load in response to said drive control signals; and transition control circuit means interposed between said drive control circuit means and said power switching means and responsive to predetermined additional control signals for shaping the rise time of the voltage feed to the load in a predetermined fashion for reducing the acoustic noise produced by said load; wherein said transition control circuit means includes voltage sensing means for sensing the voltage across said power switching means, and voltage comparator means for comparing the voltage sensed by said voltage sensing means with a predetermined voltage and coupled to said drive control circuit means for increasing the rate of transition of the voltage feed to the load after the start of an on-to-off transition of the power signal produced by the power switching means.

2. A system according to claim 1 and further comprising load compensation circuit means including current sensing means for sensing the current to said load and coupled to said drive control means for increasing the output voltage to said load to compensate for voltage drops experienced intermediate said power switching means and said load due to current draw by the load.

3. A system according to claim 2 wherein said load compensation circuit means further includes time delay control means for varying the amount of time delay in the voltage feed to the load in each AC half-cycle a predetermined fashion in accordance with the instantaneous AC line voltage throughout the AC line voltage cycle.

4. A system according to claim 1 and further including line voltage regulation circuit means coupled with said phase control timing circuit means for controllably varying a conduction angle of the phase controlled signal produced thereby in response to AC line voltage variations.

5. A system according to claim 4 wherein said line voltage regulation circuit means comprises sample and hold circuit means which samples a full-wave rectified line voltage signal only once per AC cycle to minimize response time and out overshoot on each half-cycle of AC voltage; memory means responsive to said sample and hold circuit for generating a current correction signal, and timing ramp generator means responsive to the AC line voltage and to said memory means for generating a corrected ramp signal for varying the conduction angle of the phase-control timing signal generated by the phase-control timing circuit means.

6. A system according to claim 1 and further including short circuit protection circuit means comprising current sensing means for sensing the instantaneous current to the load and producing a corresponding voltage signal; line voltage sensing means for producing a voltage signal corresponding to the line voltage; voltage comparator circuit means for comparing said voltages produced by said line voltage sensing means and said current sensing means and producing a corresponding control voltage for causing said drive control circuit means to control the power switching circuit means for cutting off current to the load when the proportion of the instantaneous current to the line voltage exceeds a predetermined proportion, until the power line voltage reaches a zero crossing, to thereby allow repetitive application of current to said load every half-cycle.

7. A system according to claim 1 and further including load compensation circuit means comprising long-term current limiting circuit means comprising current sensing means for sensing the instantaneous current to said load; averaging filter means for averaging said instantaneous current sensed by the current sensing means to produce a signal corresponding to the long-term load current and means for comparing said signal corresponding to said long-term current with a selectively time-variable threshold voltage for causing said drive control circuit means to limit the current delivered by said power switching circuit means to said load when the long-term instantaneous current exceeds a predetermined average rated power of said systems.

8. A system according to claim 1 and further including circuit means for sharing current among a plurality of compatible ones of said semiconductor-controlled power control systems and for providing substantially equal or properly proportioned current sharing between said systems.

9. An improved semiconductor-controlled power control system comprising: power supply means for receiving an AC line voltage and for converting said AC line voltage to predetermined rectified AC and DC power supplies; phase control timing circuit means coupled to said power supply means for generating and shaping electrical timing signals; drive control circuit means responsive to said electrical timing signals for producing predetermined drive signals; semiconductor power switching means for delivering power to a load in response to said drive control signals; and transition control circuit means interposed between said drive control circuit means and said power switching means and responsive to predetermined additional control signals for shaping the rise time of the voltage feed to the load in a predetermined fashion for reducing the acoustic noise produced by said load; wherein said transition control circuit means includes current sensing means for sensing the instantaneous current to the load and producing a corresponding voltage signal, and voltage comparator means for comparing said corresponding voltage signal with a predetermined voltage and coupled to said drive control circuit means for varying said drive control signal to cause said power switching means to reduce the rate of transition of the voltage near the end of the on-to-off transition of the power signal produced by said power switching means; and wherein said voltage comparator means compares said corresponding voltage signal to the line voltage for varying the drive control signal to cause said power switching means to reduce the rate of transition of the voltage when the line voltage at the moment of the start of transition is below a preselected voltage.

10. An improved semiconductor-controlled power control system comprising: power supply means for receiving an AC line voltage and for converting said AC line voltage to predetermined rectified AC and DC power supplies; phase control timing circuit means coupled to said power supply means for generating and shaping electrical timing signals; drive control circuit means responsive to said electrical timing signals for producing predetermined drive signals; semiconductor power switching means for delivering power to a load in response to said drive control signals; and circuit means for sharing current among a plurality of identical or compatible ones of said semiconductor-controlled power control systems and for providing substantially equal or properly proportioned current sharing between said systems.

11. A system according to claim 10 wherein said circuit means for sharing current comprises relatively low-value resistive means in the current path of the semiconductor power switching means of each of said systems and capacitive means coupled intermediate the semiconductor power switching means of each said system.

12. An improved semiconductor-controlled power control system comprising: power supply means for receiving an AC line voltage and for converting said AC line voltage to predetermined rectified AC and DC power supplies; phase control timing circuit means coupled to said power supply means for generating and shaping electrical timing signals; drive control circuit means responsive to said electrical timing signals for producing predetermined drive signals; semiconductor power switching means for delivering power to a load in response to said drive control signals; and load compensation circuit means including current sensing means for sensing the current to said load and coupled to said drive control means for increasing the output voltage to said load to compensate for voltage drops experienced intermediate said power switching means and said load due to current draw by the load.

13. An improved semiconductor-controlled power control system comprising: power supply means for receiving an AC line voltage and for converting said AC line voltage to predetermined rectified AC and DC power supplied; phase control timing circuit means coupled to said power supply means for generating and shaping electrical timing signals; drive control circuit means responsive to said electrical timing signals for producing predetermined drive signals; semiconductor power switching means for delivering power to a load in response to said drive control signals; sand line voltage regulation circuit means coupled with said phase control timing circuit means of controllably varying a conduction angle of the phase controlled signal produced thereby in response to AC line voltage variations; wherein said line voltage regulation circuit means comprises sample and hold circuit means which samples a full-wave rectified line voltage signal only once per AC cycle to minimize response time and overshoot on each half-cycle of AC voltage; memory means responsive to said sample and hold circuit for generating a current correction signal, and timing ramp generator means responsive to the AC line voltage and to said memory means for generating a corrected ramp signal for varying the conduction angle of the phase-control timing signal generated by the phase-control timing circuit means.

14. An improved semiconductor-controlled power control system comprising: power supply means for receiving an AC line voltage and for converting said AC line voltage to predetermined rectified AC and DC power supplies; phase control timing circuit means coupled to said power supply means for generating and shaping electrical timing signals; drive control circuit means responsive to said electrical timing signals for producing predetermined drive signals; semiconductor power switching means for delivering power to a load in response to said drive control signals; and short circuit protection circuit means comprising current sensing means for sensing the instantaneous current to the load and producing a corresponding voltage signal; line voltage sensing means for producing a voltage signal corresponding to the line voltage; voltage comparator circuit means for comparing said voltages produced by said line voltage sensing means and said current sensing means and producing a corresponding control voltage for causing said drive control circuit means to control the power switching circuit means for cutting off current to the load when the proportion of the instantaneous current to the line voltage exceeds a predetermined proportion, until the power line voltage reaches a zero crossing, to thereby allow repetitive application of current to said load every half-cycle.

15. An improved semiconductor-controlled power control system comprising: power supply means for receiving an AC line voltage and for converting said AC line voltage to predetermined rectified AC and DC power supplies; phase control timing circuit means coupled to said power supply means for generating and shaping electrical timing signals; drive control circuit means responsive to said electrical timing signals for producing predetermined drive signals; semiconductor power switching means for delivering power to a load in response to said drive control signals; and load compensation circuit means comprising long-term current limiting circuit means comprising current sensing means for sensing the instantaneous current to said load; averaging filter means for averaging said instantaneous current sensed by the current sensing means to produce a signal corresponding to the long-term load current and means for comparing said signal corresponding to said long-term current with a selectively time-variable threshold voltage for causing said drive control circuit means to limit the current delivered by said power switching circuit means to said load when the long-term instantaneous current exceeds a predetermined average rated power of said system.

* * * * *

UNITED STATES PATENT AND TRADEMARK OFFICE
CERTIFICATE OF CORRECTION

PATENT NO. : 5,268,631
DATED : December 7, 1993
INVENTOR(S) : John E. Gorman and Rufus W. Warren It is certified that error appears in the above-indentified patent and that said Letters Patent is hereby corrected as shown below:

Column 8, Line 7 "C20" should be -- C203 --
Column 12, Line 7 " varoius " should be -- various --
Column 13, Line 37 " and out overshoot" should be -- and overshoot --

Signed and Sealed this

Twenty-eighth Day of June, 1994

Attest:

BRUCE LEHMAN

*Attesting Officer*  *Commissioner of Patents and Trademarks*